(12) United States Patent
Piaskowski et al.

(10) Patent No.: US 10,528,013 B2
(45) Date of Patent: Jan. 7, 2020

(54) SYSTEMS AND METHODS FOR INTERFACING WITH A BUILDING MANAGEMENT SYSTEM

(71) Applicant: Johnson Controls Technology Company, Plymouth, MI (US)

(72) Inventors: Ryan A. Piaskowski, Milwaukee, WI (US); Nicole Ann Madison, Milwaukee, WI (US); Beth Ray, Oak Creek, WI (US); Adam R. Grabowski, Brookfield, WI (US); Alan S. Schwegler, Shorewood, WI (US); Garrett Wiens-Kind, Milwaukee, WI (US); Joseph M. Mueller, Hales Corners, WI (US); Jonathan M. Schwabe, Franklin, WI (US)

(73) Assignee: Johnson Controls Technology Company, Auburn Hills, MI (US)

( * ) Notice: Subject to any disclaimer, the term of this patent is extended or adjusted under 35 U.S.C. 154(b) by 128 days.

(21) Appl. No.: 15/593,898

(22) Filed: May 12, 2017

(65) Prior Publication Data
US 2017/0329292 A1 Nov. 16, 2017

Related U.S. Application Data

(60) Provisional application No. 62/336,520, filed on May 13, 2016.

(51) Int. Cl.
*G06F 19/00* (2018.01)
*G05B 15/02* (2006.01)
*H04L 12/28* (2006.01)

(52) U.S. Cl.
CPC .......... *G05B 15/02* (2013.01); *H04L 12/2809* (2013.01); *G05B 2219/2642* (2013.01)

(58) Field of Classification Search
CPC ............ G05B 15/02; G05B 2219/2642; H04L 12/2809
See application file for complete search history.

(56) References Cited

U.S. PATENT DOCUMENTS

| 6,487,457 B1 * | 11/2002 | Hull ....................... G05B 15/02 700/17 |
| 2003/0078677 A1 * | 4/2003 | Hull ....................... G05B 15/02 700/1 |

OTHER PUBLICATIONS

Siemens "Scheduler: Technical Specification Sheer", Document No. 149-337P25, Jan. 10, 2014 (Year: 2014).*

* cited by examiner

*Primary Examiner* — Michael D Masinick
(74) *Attorney, Agent, or Firm* — Foley & Lardner LLP

(57) ABSTRACT

A building management system (BMS) interface system. The BMS interface system includes a user interface and a BMS controller in communication with the user interface. The BMS controller includes a processor. The processor is configured to display a graphical scheduling interface on the user interface and receive a scheduling input from the user interface. The processor is further configured to extract one or more scheduling elements from the received scheduling input and convert the scheduling elements into one or more BMS data objects. The processor is further configured to update the graphical scheduling interface displayed on the user interface. The processor is also configured to execute one or more scheduling instructions based on the received scheduling input, wherein the scheduling instructions are associated with the operation of one or more BMS devices.

20 Claims, 26 Drawing Sheets

| Priority | New | Type | Trigger Value | Equipment | Name | Space | Occurred |
|---|---|---|---|---|---|---|---|
| 70 | false | Alarm | Alarm | AHJ-2 | FFILT-S | Floor 2 | 02/22/2016 1:27 PM |
| 106 | false | Normal | Online | VAV-200 | VAV-200 | Room 12 | 02/22/2016 1:27 PM |
| 106 | false | Normal | Online | VAV-203 | VAV-203 | Room 07 | 02/22/2016 1:27 PM |
| 106 | false | Normal | Online | VAV-101 | VAV-101 | Conference Rm | 02/22/2016 1:27 PM |
| 106 | false | Normal | Online | VAV-103 | VAV-103 | Admin Area A | 02/22/2016 1:27 PM |
| 70 | false | Unreliable | 0.0 deg F | VAV-111 | ZN-T | Room 3 | 02/22/2016 1:27 PM |
| 70 | false | Unreliable | 0.0 deg F | VAV-107 | ZN-T | Suite A | 02/22/2016 1:27 PM |
| 70 | false | Unreliable | 0.0 deg F | VAV-109 | ZN-T | Room 01 | 02/22/2016 1:27 PM |
| 70 | false | Unreliable | 0.0 deg F | VAV-105 | ZN-T | Cafeteria A | 02/22/2016 1:27 PM |
| 106 | false | Normal | Online | VAV-102 | VAV-102 | Front Lobby | 02/22/2016 1:27 PM |
| 106 | false | Normal | Online | VAV-106 | VAV-106 | Cafeteria B | 02/22/2016 1:27 PM |
| 106 | false | Normal | Online | VAV-108 | VAV-108 | Suite B | 02/22/2016 1:27 PM |
| 106 | false | Normal | Online | VAV-201 | VAV-201 | Elevator Lobby | 02/22/2016 1:27 PM |
| 106 | false | Normal | Online | VAV-204 | VAV-201 | Room 08 | 02/22/2016 1:27 PM |
| 106 | false | Normal | Online | VAV-207 | VAV-207 | Room 11 | 02/22/2016 1:27 PM |
| 106 | false | Normal | Online | VAV-206 | VAV-206 | Room 10 | 02/22/2016 1:27 PM |
| 106 | false | Normal | Online | VAV-111 | VAV-111 | Room 03 | 02/22/2016 1:27 PM |
| 106 | false | Normal | Online | VAV-107 | VAV-107 | Suite A | 02/22/2016 1:27 PM |
| 106 | false | Normal | Online | VAV-109 | VAV-109 | Room 01 | 02/22/2016 1:27 PM |
| 106 | false | Normal | Online | VAV-105 | VAV-105 | Cafeteria A | 02/22/2016 1:27 PM |
| 106 | false | Normal | Online | AHJ-2 | AHJ-2 | Floor 2 | 02/22/2016 1:27 PM |
| 106 | false | Normal | Online | VAV-205 | VAV-205 | Room 09 | 02/22/2016 1:27 PM |
| 106 | false | Normal | Online | VAV-209 | VAV-209 | Room 13 | 02/22/2016 1:27 PM |
| 106 | false | Normal | Online | VAV-110 | VAV-110 | Room 02 | 02/22/2016 1:27 PM |

JCI Medical Center

POTENTIAL PROBLEM AREAS

Data Generated: 1m ago

| ITEM | VALUE | EQUIPMENT | SPACE(S) |
|---|---|---|---|
| FFLT-5<br>FINAL FILTER STATUS | ALARM<br>Alarm | AHU-2 | Floor 2 |
| CAF-3*<br>DUCT STATIC PRESSURE SETPOINT | OPERATOR OVERRIDE<br>1.20 in wc | AHU-1 | Floor 1 |

EQUIPMENT SERVING SPACE

AHU-1

| | | FILTER |
|---|---|---|
| DISCHARGE AIR TEMPERATURE | Normal | 61.6 deg F |
| DISCHARGE AIR TEMPERATURE SETPOINT | Normal | 55.0 deg F |
| EFFECTIVE DISCHARGE AIR SETPOINT | Normal | 55.0 deg F |

▶ MORE    1 of 1

POTENTIAL PROBLEM AREAS

Data Generated: 1m ago    FILTER

| ITEM | VALUE | EQUIPMENT | SPACE(S) |
|---|---|---|---|
| ZONE TEMPERATURE | LOW WARNING 69.9 deg F | VAV-100 | Room 01 |
| ZONE TEMPERATURE | LOW WARNING 70.4 deg F | VAV-113 | Room 05 |
| ZONE TEMPERATURE | LOW WARNING 70.8 deg F | VAV-114 | Team Room |
| ZONE TEMPERATURE | LOW WARNING 71.6 deg F | VAV-106 | Cafeteria D |
| ZONE TEMPERATURE | LOW WARNING 72.0 deg F | VAV-101 | Conference Room |

EQUIPMENT SUMMARY

| EQUIPMENT | SPACE(S) | DA-T | DAT-SP | EFFDAT-SP | DAI-P | DAF-SP | DAPHI-A | MAS-AHU | OA-T | PH-T |
|---|---|---|---|---|---|---|---|---|---|---|
| AHU-1 | Floor 1 | 61.6 deg F | 55.0 deg F | 55.0 deg F | 2.50 in wc | 1.20 in wc | Normal | | 78.0 deg F | 66.4 deg F |

Sidebar:
- JCI Medical Center
- Main Hospital
- Floor 1
- Conference Room
- Front Lobby
- Admin Area A
- Admin Area B
- Cafeteria A
- Cafeteria B
- Suite A
- Suite B
- Room 01
- Room 02
- Room 03
- Room 04
- Room 05
- Team Room

FIG. 25

EQUIPMENT SUMMARY — Floor 1

| EQUIPMENT | SPACE(S) | 7N-T | 7N-T STATE | FFFHTG-SF | 7N-SP | FFFCLG-SP | WC-ADJ | OCC-MODF | SA-F |
|---|---|---|---|---|---|---|---|---|---|
| VAV-101 | Conference Room | 71.1 deg F | Box Htg | 74.0 deg F | 72.0 deg F | 78.0 deg F | 4.0 deg F | Occupied | 0 cfm |
| VAV-102 | Front Lobby | 84.7 deg F | Prmy Clg | 74.0 deg F | 72.0 deg F | 78.0 deg F | 4.0 deg F | Occupied | 0 cfm |
| VAV-103 | Admin Area A | 71.1 deg F | Box Htg | 72.0 deg F | 72.0 deg F | 76.0 deg F | 2.0 deg F | Occupied | 0 cfm |
| VAV-104 | Admin Area B | 73.1 deg F | Box Htg | 74.0 deg F | 72.0 deg F | 78.0 deg F | 4.0 deg F | Occupied | 0 cfm |
| VAV-105 | Cafeteria A | 72.5 deg F | Box Htg | 74.0 deg F | 72.0 deg F | 78.0 deg F | 4.0 deg F | Occupied | 0 cfm |
| VAV-106 | Cafeteria B | 71.6 deg F | Box Htg | 72.0 deg F | 72.0 deg F | 76.0 deg F | 2.0 deg F | Occupied | 0 cfm |
| VAV-107 | Suite A | 71.2 deg F | Box Htg | 74.0 deg F | 72.0 deg F | 78.0 deg F | 4.0 deg F | Occupied | 0 cfm |
| VAV-108 | Suite B | 72.1 deg F | Satisfied | 61.0 deg F | 72.0 deg F | 82.0 deg F | 4.0 deg F | UnOccupied | 0 cfm |
| VAV-109 | Room 01 | 69.0 deg F | Box Htg | 72.0 deg F | 72.0 deg F | 76.0 deg F | 2.0 deg F | Occupied | 0 cfm |
| VAV-110 | Room 02 | 73.5 deg F | Box Htg | 74.0 deg F | 72.0 deg F | 78.0 deg F | 4.0 deg F | Occupied | 0 cfm |
| VAV-111 | Room 03 | 72.2 deg F | Box Htg | 72.0 deg F | 72.0 deg F | 78.0 deg F | 2.0 deg F | Occupied | 0 cfm |
| VAV-112 | Room 04 | 72.7 deg F | Box Htg | 74.0 deg F | 72.0 deg F | 78.0 deg F | 4.0 deg F | Occupied | 0 cfm |
| VAV-113 | Room 05 | 70.4 deg F | Box Htg | 74.0 deg F | 72.0 deg F | 78.0 deg F | 4.0 deg F | Occupied | 0 cfm |
| VAV-114 | Team Room | 70.8 deg F | Box Htg | 74.0 deg F | 72.0 deg F | 78.0 deg F | 4.0 deg F | Occupied | 0 cfm |

Navigation: JCI Medical Center / Main Hospital / Floor 1 / Conference Room / Front Lobby / Admin Area A / Admin Area B / Cafeteria A / Cafeteria B / Suite A / Suite B / Room 01 / Room 02 / Room 03 / Room 04 / Room 05 / Team Room VAV Boxes

SYSTEMS AND METHODS FOR INTERFACING WITH A BUILDING MANAGEMENT SYSTEM

CROSS-REFERENCE TO RELATED APPLICATIONS

This applications claims priority to and the benefit of Provisional U.S. Patent Application No. 62/336,520, filed May 13, 2016 and entitled "BUILDING MANAGEMENT SYSTEM USER INTERFACES," which is hereby incorporated in its entirety.

BACKGROUND

The present disclosure relates generally to the field of building management systems. A building management system (BMS) is, in general, a system of devices configured to control, monitor, and manage equipment in or around a building or building area. A BMS can include, for example, an HVAC system, a security system, a lighting system, a fire alerting system, any other system that is capable of managing building functions or devices, or any combination thereof. Specifically, the present disclosure relates to a user interface for use with a BMS, the user interface allowing for a user to easily interface with the BMS system as a whole.

SUMMARY

One implementation of the present disclosure is a building management system (BMS) interface system. The BMS interface system includes a user interface and a BMS controller in communication with the user interface. The BMS controller includes a processor. The processor is configured to display a graphical scheduling interface on the user interface and receive a scheduling input from the user interface. The processor is further configured to extract one or more scheduling elements from the received scheduling input and convert the scheduling elements into one or more BMS data objects. The processor is further configured to update the graphical scheduling interface displayed on the user interface. The processor is also configured to execute one or more scheduling instructions based on the received scheduling input, wherein the scheduling instructions are associated with the operation of one or more BMS devices.

A further implementation of the present disclosure is a method for scheduling one or more building management system (BMS) operations for a space. The method includes receiving a scheduling input from a user at a BMS controller and extracting one or more scheduling elements from the scheduling input. The method also includes converting the extracting scheduling elements into one or more BMS data objects and transmitting a schedule confirmation request to the user. The method also includes receiving a schedule confirmation from the user at the BMS controller and executing the confirmed schedule, wherein executing the confirmed schedule comprises operating one or more BMS devices based on the confirmed schedule.

A further implementation of the present disclosure is a building management system (BMS) graphical user interface system. The BMS graphical user interface system includes a user interface device, and a BMS controller in communication with the user interface device. The BMS controller includes a processor configured to automatically associate one or more BMS devices with a space. The processor is further configured to display a graphical scheduling interface for the space on the user interface device, wherein the graphical scheduling interface is configured to display an operational schedule for the one or more BMS devices associated with the space. The processor is further configured to receive a scheduling input from the user interface, wherein the scheduling input is one of a new schedule request and a schedule modification request. The processor is further configured to extract one or more scheduling elements from the received scheduling input and convert the scheduling elements into one or more BMS data objects, wherein the BMS data objects are data objects capable of being executed by the BMS controller. The processor is also configured to execute one or more scheduling instructions, wherein the scheduling instructions are associated with the operation of one or more BMS devices.

Those skilled in the art will appreciate that the summary is illustrative only and is not intended to be in any way limiting. Other aspects, inventive features, and advantages of the devices and/or processes described herein, as defined solely by the claims, will become apparent in the detailed description set forth herein and taken in conjunction with the accompanying drawings.

BRIEF DESCRIPTION OF THE DRAWINGS

FIG. 12 is an illustration of an alarm report, according to some embodiments.

FIG. 13 is an illustration of a schedule overview GUI, according to some embodiments.

FIG. 14 is an illustration of a location schedule GUI, according to some embodiments.

FIG. 15 is an illustration of a room effective schedule GUI, according to some embodiments.

FIG. 21 is an illustration of a potential problems interface GUI, according to some embodiments.

FIG. 23 is an illustration of a floor equipment service space interface GUI, according to some embodiments.

FIG. 25 is an illustration of an equipment serving space summary interface GUI, according to some embodiments.

DETAILED DESCRIPTION

Building Management System and HVAC System

Figure 1:
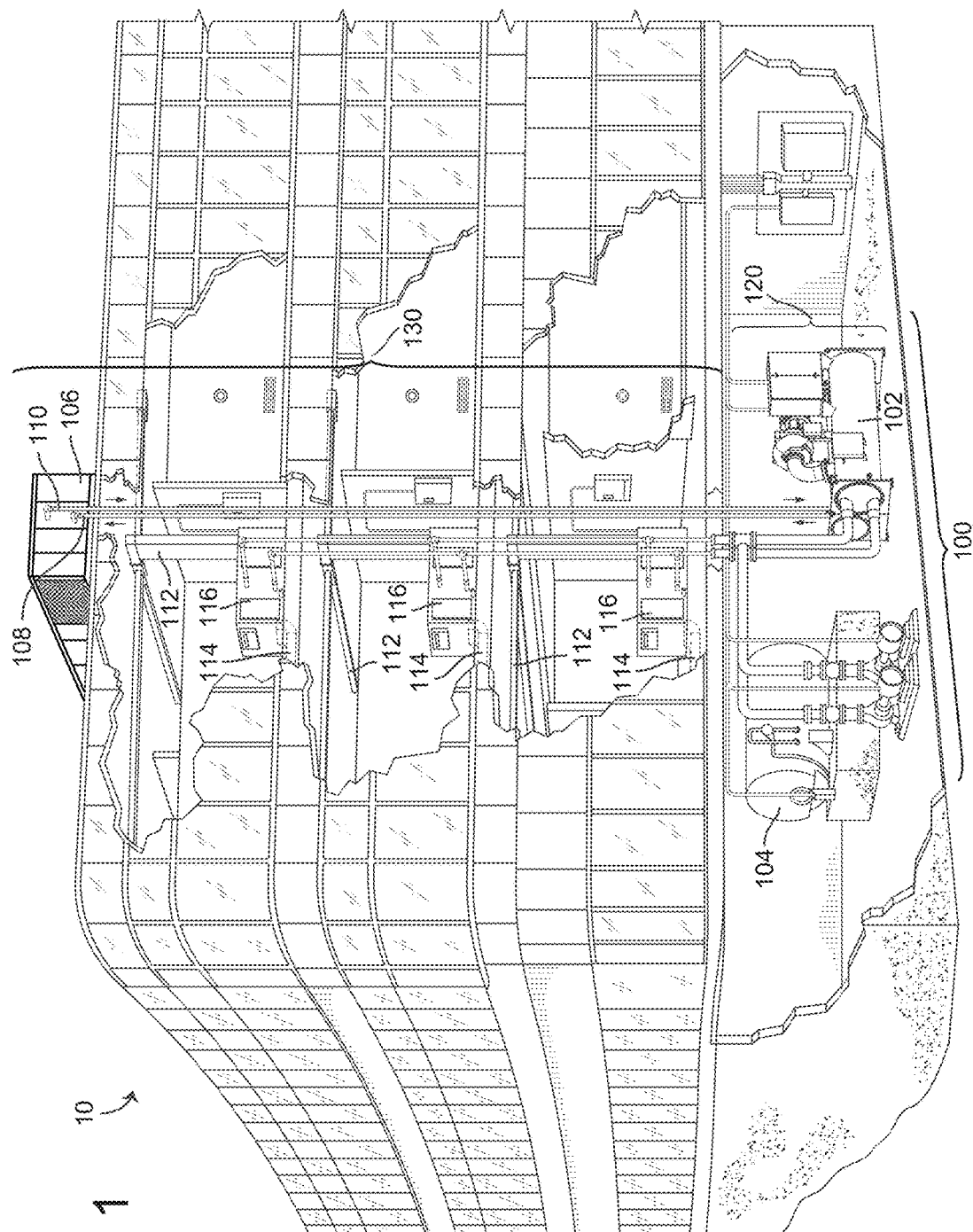
FIG. 1 is a drawing of a building equipped with a building management system (BMS) and a HVAC system, according to some embodiments.

Referring now to FIGS. 1-4, an exemplary building management system (BMS) and HVAC system in which the systems and methods of the present disclosure can be implemented are shown, according to an exemplary embodiment. Referring particularly to FIG. 1, a perspective view of a building 10 is shown. Building 10 is served by a BMS. A BMS is, in general, a system of devices configured to control, monitor, and manage equipment in or around a building or building area. A BMS can include, for example, a HVAC system, a security system, a lighting system, a fire alerting system, any other system that is capable of managing building functions or devices, or any combination thereof.

The BMS that serves building 10 includes an HVAC system 100. HVAC system 100 can include a plurality of HVAC devices (e.g., heaters, chillers, air handling units, pumps, fans, thermal energy storage, etc.) configured to provide heating, cooling, ventilation, or other services for building 10. For example, HVAC system 100 is shown to include a waterside system 120 and an airside system 130. Waterside system 120 can provide a heated or chilled fluid to an air handling unit of airside system 130. Airside system 130 can use the heated or chilled fluid to heat or cool an airflow provided to building 10. An exemplary waterside system and airside system which can be used in HVAC system 100 are described in greater detail with reference to FIGS. 2-3.

HVAC system 100 is shown to include a chiller 102, a boiler 104, and a rooftop air handling unit (AHU) 106. Waterside system 120 can use boiler 104 and chiller 102 to heat or cool a working fluid (e.g., water, glycol, etc.) and can circulate the working fluid to AHU 106. In various embodiments, the HVAC devices of waterside system 120 can be located in or around building 10 (as shown in FIG. 1) or at an offsite location such as a central plant (e.g., a chiller plant, a steam plant, a heat plant, etc.). The working fluid can be heated in boiler 104 or cooled in chiller 102, depending on whether heating or cooling is required in building 10. Boiler 104 can add heat to the circulated fluid, for example, by burning a combustible material (e.g., natural gas) or using an electric heating element. Chiller 102 can place the circulated fluid in a heat exchange relationship with another fluid (e.g., a refrigerant) in a heat exchanger (e.g., an evaporator) to absorb heat from the circulated fluid. The working fluid from chiller 102 and/or boiler 104 can be transported to AHU 106 via piping 108.

AHU 106 can place the working fluid in a heat exchange relationship with an airflow passing through AHU 106 (e.g., via one or more stages of cooling coils and/or heating coils). The airflow can be, for example, outside air, return air from within building 10, or a combination of both. AHU 106 can transfer heat between the airflow and the working fluid to provide heating or cooling for the airflow. For example, AHU 106 can include one or more fans or blowers configured to pass the airflow over or through a heat exchanger containing the working fluid. The working fluid can then return to chiller 102 or boiler 104 via piping 110.

Airside system 130 can deliver the airflow supplied by AHU 106 (i.e., the supply airflow) to building 10 via air supply ducts 112 and can provide return air from building 10 to AHU 106 via air return ducts 114. In some embodiments, airside system 130 includes multiple variable air volume (VAV) units 116. For example, airside system 130 is shown to include a separate VAV unit 116 on each floor or zone of building 10. VAV units 116 can include dampers or other flow control elements that can be operated to control an amount of the supply airflow provided to individual zones of building 10. In other embodiments, airside system 130 delivers the supply airflow into one or more zones of building 10 (e.g., via supply ducts 112) without using intermediate VAV units 116 or other flow control elements. AHU 106 can include various sensors (e.g., temperature sensors, pressure sensors, etc.) configured to measure attributes of the supply airflow. AHU 106 can receive input from sensors located within AHU 106 and/or within the building zone and can adjust the flow rate, temperature, or other attributes of the supply airflow through AHU 106 to achieve set-point conditions for the building zone.

Figure 2:
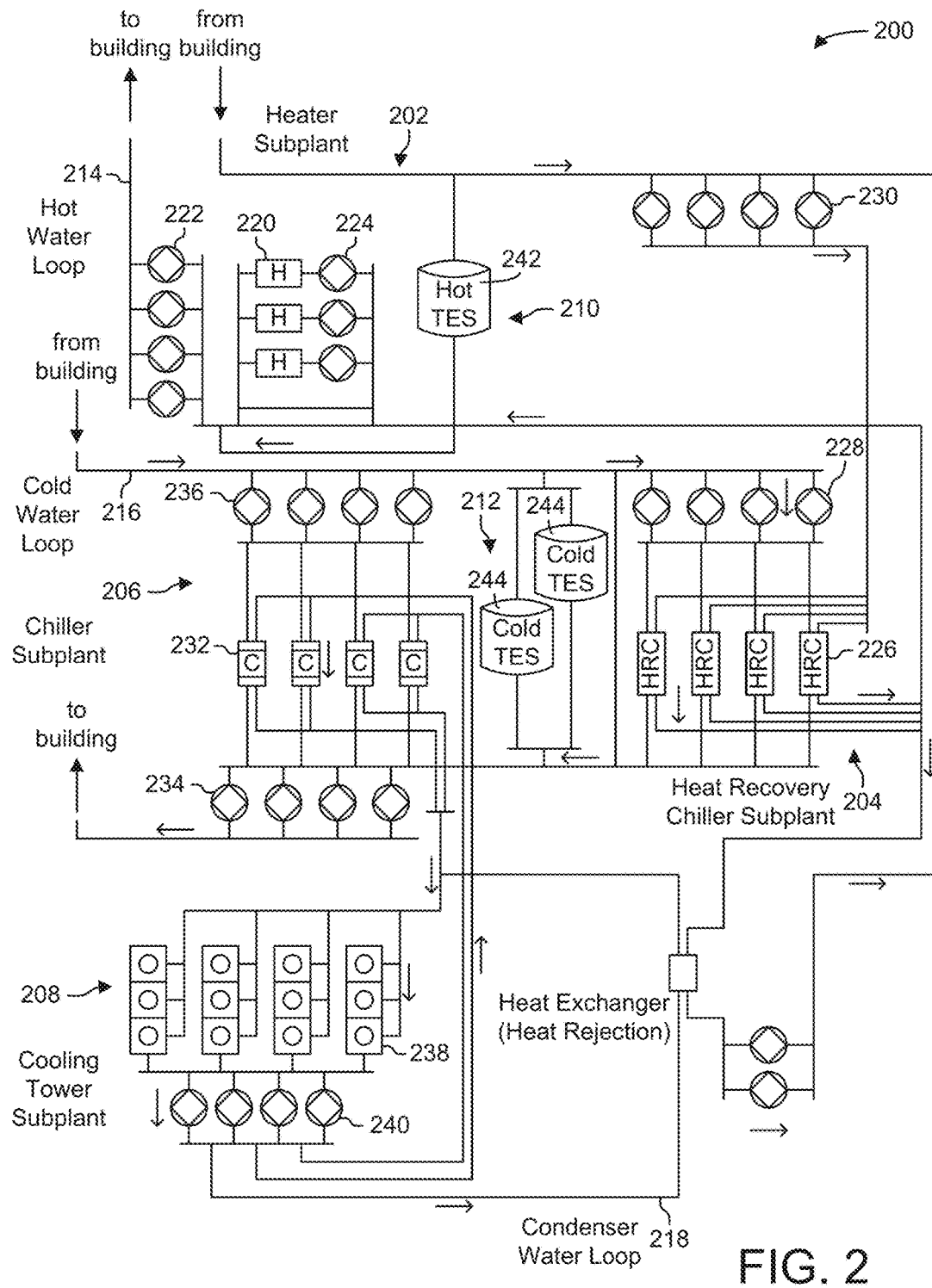
FIG. 2 is a schematic of a waterside system which can be used as part of the HVAC system of FIG. 1, according to some embodiments.

Referring now to FIG. 2, a block diagram of a waterside system 200 is shown, according to an exemplary embodiment. In various embodiments, waterside system 200 can supplement or replace waterside system 120 in HVAC system 100 or can be implemented separate from HVAC system 100. When implemented in HVAC system 100, waterside system 200 can include a subset of the HVAC devices in HVAC system 100 (e.g., boiler 104, chiller 102, pumps, valves, etc.) and can operate to supply a heated or chilled fluid to AHU 106. The HVAC devices of waterside system 200 can be located within building 10 (e.g., as components of waterside system 120) or at an offsite location such as a central plant.

In FIG. 2, waterside system 200 is shown as a central plant having a plurality of subplants 202-212. Subplants 202-212 are shown to include a heater subplant 202, a heat recovery chiller subplant 204, a chiller subplant 206, a cooling tower subplant 208, a hot thermal energy storage (TES) subplant 210, and a cold thermal energy storage (TES) subplant 212. Subplants 202-212 consume resources (e.g., water, natural gas, electricity, etc.) from utilities to serve the thermal energy loads (e.g., hot water, cold water, heating, cooling, etc.) of a building or campus. For example, heater subplant 202 can be configured to heat water in a hot water loop 214 that circulates the hot water between heater subplant 202 and building 10. Chiller subplant 206 can be configured to chill water in a cold water loop 216 that circulates the cold water between chiller subplant 206 building 10. Heat recovery chiller subplant 204 can be configured to transfer heat from cold water loop 216 to hot water loop 214 to provide additional heating for the hot water and additional cooling for the cold water. Condenser water loop 218 can absorb heat from the cold water in chiller subplant 206 and reject the absorbed heat in cooling tower subplant 208 or transfer the absorbed heat to hot water loop 214. Hot TES subplant 210 and cold TES subplant 212 can store hot and cold thermal energy, respectively, for subsequent use.

Hot water loop 214 and cold water loop 216 can deliver the heated and/or chilled water to air handlers located on the rooftop of building 10 (e.g., AHU 106) or to individual floors or zones of building 10 (e.g., VAV units 116). The air handlers push air past heat exchangers (e.g., heating coils or cooling coils) through which the water flows to provide heating or cooling for the air. The heated or cooled air can be delivered to individual zones of building 10 to serve the thermal energy loads of building 10. The water then returns to subplants 202-212 to receive further heating or cooling.

Although subplants 202-212 are shown and described as heating and cooling water for circulation to a building, it is understood that any other type of working fluid (e.g., glycol, CO2, etc.) can be used in place of or in addition to water to serve the thermal energy loads. In other embodiments, subplants 202-212 can provide heating and/or cooling directly to the building or campus without requiring an intermediate heat transfer fluid. These and other variations to waterside system 200 are within the teachings of the present invention.

Each of subplants 202-212 can include a variety of equipment configured to facilitate the functions of the subplant. For example, heater subplant 202 is shown to include a plurality of heating elements 220 (e.g., boilers, electric heaters, etc.) configured to add heat to the hot water in hot water loop 214. Heater subplant 202 is also shown to include several pumps 222 and 224 configured to circulate the hot water in hot water loop 214 and to control the flow rate of the hot water through individual heating elements 220. Chiller subplant 206 is shown to include a plurality of chillers 232 configured to remove heat from the cold water in cold water loop 216. Chiller subplant 206 is also shown to include several pumps 234 and 236 configured to circulate the cold water in cold water loop 216 and to control the flow rate of the cold water through individual chillers 232.

Heat recovery chiller subplant 204 is shown to include a plurality of heat recovery heat exchangers 226 (e.g., refrigeration circuits) configured to transfer heat from cold water loop 216 to hot water loop 214. Heat recovery chiller subplant 204 is also shown to include several pumps 228 and 230 configured to circulate the hot water and/or cold water through heat recovery heat exchangers 226 and to control the flow rate of the water through individual heat recovery heat exchangers 226. Cooling tower subplant 208 is shown to include a plurality of cooling towers 238 configured to remove heat from the condenser water in condenser water loop 218. Cooling tower subplant 208 is also shown to include several pumps 240 configured to circulate the condenser water in condenser water loop 218 and to control the flow rate of the condenser water through individual cooling towers 238.

Hot TES subplant 210 is shown to include a hot TES tank 242 configured to store the hot water for later use. Hot TES subplant 210 can also include one or more pumps or valves configured to control the flow rate of the hot water into or out of hot TES tank 242. Cold TES subplant 212 is shown to include cold TES tanks 244 configured to store the cold water for later use. Cold TES subplant 212 can also include one or more pumps or valves configured to control the flow rate of the cold water into or out of cold TES tanks 244.

In some embodiments, one or more of the pumps in waterside system 200 (e.g., pumps 222, 224, 228, 230, 234, 236, and/or 240) or pipelines in waterside system 200 include an isolation valve associated therewith. Isolation valves can be integrated with the pumps or positioned upstream or downstream of the pumps to control the fluid flows in waterside system 200. In various embodiments, waterside system 200 can include more, fewer, or different types of devices and/or subplants based on the particular configuration of waterside system 200 and the types of loads served by waterside system 200.

Figure 3:
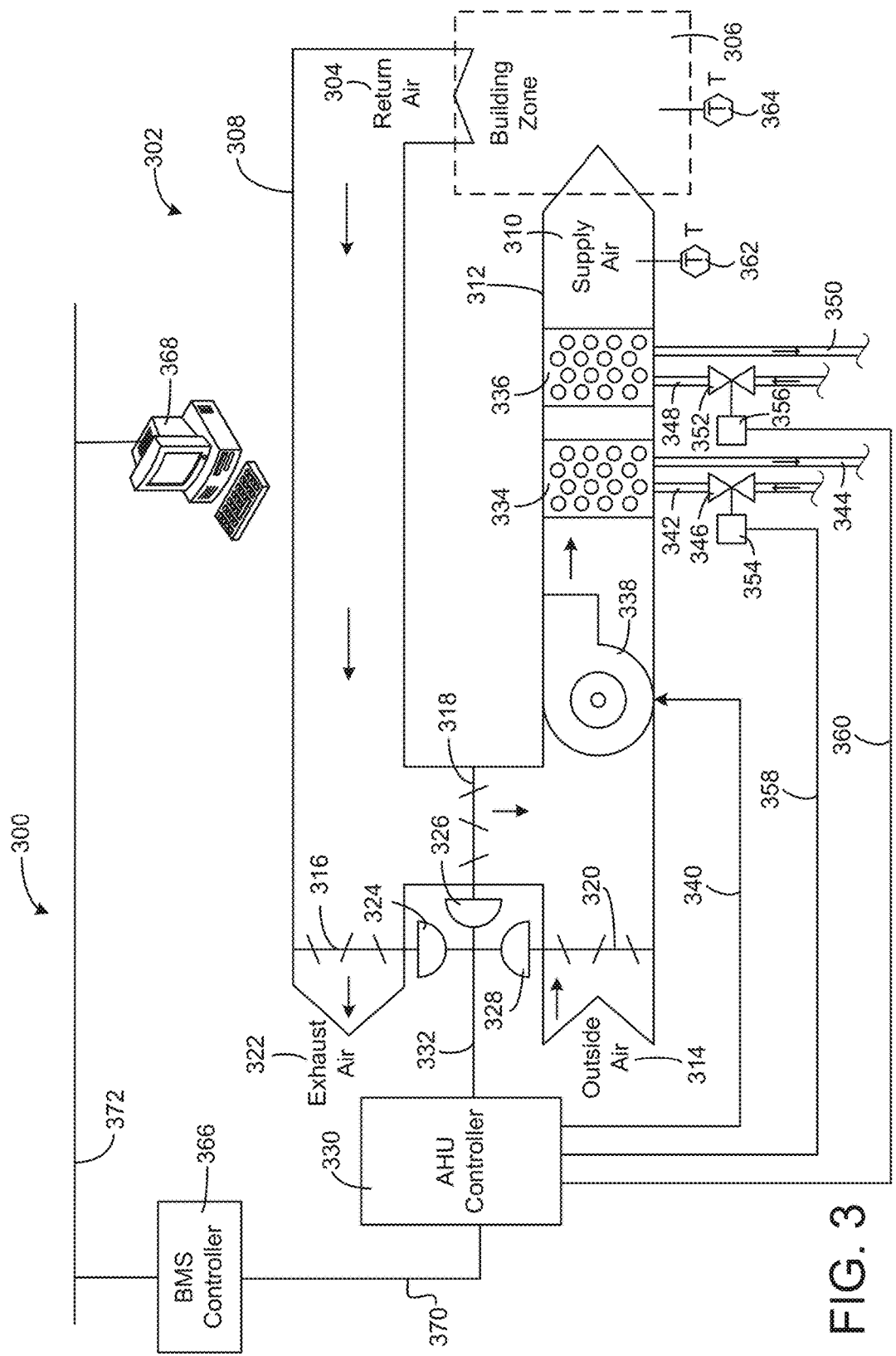
FIG. 3 is a block diagram of an airside system which can be used as part of the HVAC system of FIG. 1, according to some embodiments.

Referring now to FIG. 3, a block diagram of an airside system 300 is shown, according to an exemplary embodiment. In various embodiments, airside system 300 can supplement or replace airside system 130 in HVAC system 100 or can be implemented separate from HVAC system 100. When implemented in HVAC system 100, airside system 300 can include a subset of the HVAC devices in HVAC system 100 (e.g., AHU 106, VAV units 116, ducts 112-114, fans, dampers, etc.) and can be located in or around building 10. Airside system 300 can operate to heat or cool an airflow provided to building 10 using a heated or chilled fluid provided by waterside system 200.

In FIG. 3, airside system 300 is shown to include an economizer-type air handling unit (AHU) 302. Economizer-type AHUs vary the amount of outside air and return air used by the air handling unit for heating or cooling. For example, AHU 302 can receive return air 304 from building zone 306 via return air duct 308 and can deliver supply air 310 to building zone 306 via supply air duct 312. In some embodiments, AHU 302 is a rooftop unit located on the roof of building 10 (e.g., AHU 106 as shown in FIG. 1) or otherwise positioned to receive both return air 304 and outside air 314. AHU 302 can be configured to operate exhaust air damper 316, mixing damper 318, and outside air damper 320 to control an amount of outside air 314 and return air 304 that combine to form supply air 310. Any return air 304 that does not pass through mixing damper 318 can be exhausted from AHU 302 through exhaust damper 316 as exhaust air 322.

Each of dampers 316-320 can be operated by an actuator. For example, exhaust air damper 316 can be operated by actuator 324, mixing damper 318 can be operated by actuator 326, and outside air damper 320 can be operated by actuator 328. Actuators 324-328 can communicate with an AHU controller 330 via a communications link 332. Actuators 324-328 can receive control signals from AHU controller 330 and can provide feedback signals to AHU controller 330. Feedback signals can include, for example, an indication of a current actuator or damper position, an amount of torque or force exerted by the actuator, diagnostic information (e.g., results of diagnostic tests performed by actuators 324-328), status information, commissioning information, configuration settings, calibration data, and/or other types of information or data that can be collected, stored, or used by actuators 324-328. AHU controller 330 can be an economizer controller configured to use one or more control algorithms (e.g., state-based algorithms, extremum seeking control (ESC) algorithms, proportional-integral (PI) control algorithms, proportional-integral-derivative (PID) control algorithms, model predictive control (MPC) algorithms, feedback control algorithms, etc.) to control actuators 324-328.

Still referring to FIG. 3, AHU 302 is shown to include a cooling coil 334, a heating coil 336, and a fan 338 positioned within supply air duct 312. Fan 338 can be configured to force supply air 310 through cooling coil 334 and/or heating coil 336 and provide supply air 310 to building zone 306. AHU controller 330 can communicate with fan 338 via communications link 340 to control a flow rate of supply air 310. In some embodiments, AHU controller 330 controls an amount of heating or cooling applied to supply air 310 by modulating a speed of fan 338.

Cooling coil 334 can receive a chilled fluid from waterside system 200 (e.g., from cold water loop 216) via piping 342 and can return the chilled fluid to waterside system 200 via piping 344. Valve 346 can be positioned along piping 342 or piping 344 to control a flow rate of the chilled fluid through cooling coil 334. In some embodiments, cooling coil 334 includes multiple stages of cooling coils that can be independently activated and deactivated (e.g., by AHU controller 330, by BMS controller 366, etc.) to modulate an amount of cooling applied to supply air 310.

Heating coil 336 can receive a heated fluid from waterside system 200 (e.g., from hot water loop 214) via piping 348 and can return the heated fluid to waterside system 200 via piping 350. Valve 352 can be positioned along piping 348 or piping 350 to control a flow rate of the heated fluid through heating coil 336. In some embodiments, heating coil 336 includes multiple stages of heating coils that can be independently activated and deactivated (e.g., by AHU controller 330, by BMS controller 366, etc.) to modulate an amount of heating applied to supply air 310.

Each of valves 346 and 352 can be controlled by an actuator. For example, valve 346 can be controlled by actuator 354 and valve 352 can be controlled by actuator 356. Actuators 354-356 can communicate with AHU controller 330 via communications links 358-360. Actuators 354-356 can receive control signals from AHU controller 330 and can provide feedback signals to controller 330. In some embodiments, AHU controller 330 receives a measurement of the supply air temperature from a temperature sensor 362 positioned in supply air duct 312 (e.g., downstream of cooling coil 334 and/or heating coil 336). AHU controller 330 can also receive a measurement of the temperature of building zone 306 from a temperature sensor 364 located in building zone 306.

In some embodiments, AHU controller 330 operates valves 346 and 352 via actuators 354-356 to modulate an amount of heating or cooling provided to supply air 310 (e.g., to achieve a set-point temperature for supply air 310 or to maintain the temperature of supply air 310 within a set-point temperature range). The positions of valves 346 and 352 affect the amount of heating or cooling provided to supply air 310 by cooling coil 334 or heating coil 336 and may correlate with the amount of energy consumed to achieve a desired supply air temperature. AHU controller 330 can control the temperature of supply air 310 and/or building zone 306 by activating or deactivating coils 334-336, adjusting a speed of fan 338, or a combination of both.

Still referring to FIG. 3, airside system 300 is shown to include a building management system (BMS) controller 366 and a client device 368. BMS controller 366 can include one or more computer systems (e.g., servers, supervisory controllers, subsystem controllers, etc.) that serve as system level controllers, application or data servers, head nodes, or master controllers for airside system 300, waterside system 200, HVAC system 100, and/or other controllable systems that serve building 10. BMS controller 366 can communicate with multiple downstream building systems or subsystems (e.g., HVAC system 100, a security system, a lighting system, waterside system 200, etc.) via a communications link 370 according to like or disparate protocols (e.g., LON, BACnet, etc.). In various embodiments, AHU controller 330 and BMS controller 366 can be separate (as shown in FIG. 3) or integrated. In an integrated implementation, AHU controller 330 can be a software module configured for execution by a processor of BMS controller 366.

In some embodiments, AHU controller 330 receives information from BMS controller 366 (e.g., commands, setpoints, operating boundaries, etc.) and provides information to BMS controller 366 (e.g., temperature measurements, valve or actuator positions, operating statuses, diagnostics, etc.). For example, AHU controller 330 can provide BMS controller 366 with temperature measurements from temperature sensors 362-364, equipment on/off states, equipment operating capacities, and/or any other information that can be used by BMS controller 366 to monitor or control a variable state or condition within building zone 306.

Client device 368 can include one or more human-machine interfaces or client interfaces (e.g., graphical user interfaces, reporting interfaces, text-based computer interfaces, client-facing web services, web servers that provide pages to web clients, etc.) for controlling, viewing, or otherwise interacting with HVAC system 100, its subsystems, and/or devices. Client device 368 can be a computer workstation, a client terminal, a remote or local interface, or any other type of user interface device. Client device 368 can be a stationary terminal or a mobile device. For example, client device 368 can be a desktop computer, a computer server with a user interface, a laptop computer, a tablet, a smartphone, a PDA, or any other type of mobile or non-mobile device. Client device 368 can communicate with BMS controller 366 and/or AHU controller 330 via communications link 372.

Figure 4:
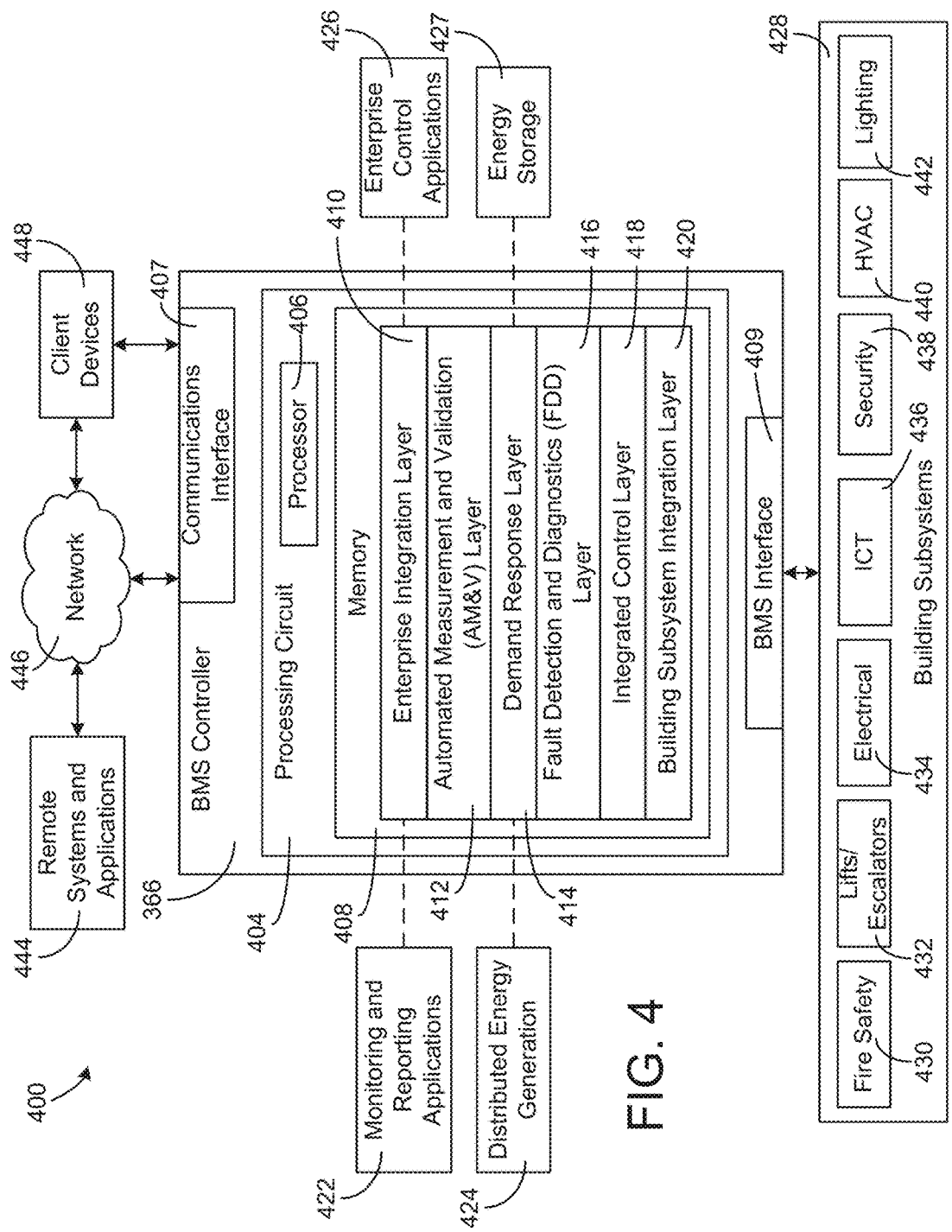
FIG. 4 is a block diagram of a BMS which can be used in the building of FIG. 1, according to some embodiments.

Referring now to FIG. 4, a block diagram of a building management system (BMS) 400 is shown, according to an exemplary embodiment. BMS 400 can be implemented in building 10 to automatically monitor and control various building functions. BMS 400 is shown to include BMS controller 366 and a plurality of building subsystems 428. Building subsystems 428 are shown to include a building electrical subsystem 434, an information communication technology (ICT) subsystem 436, a security subsystem 438, a HVAC subsystem 440, a lighting subsystem 442, a lift/escalators subsystem 432, and a fire safety subsystem 430. In various embodiments, building subsystems 428 can include fewer, additional, or alternative subsystems. For example, building subsystems 428 can also or alternatively include a refrigeration subsystem, an advertising or signage subsystem, a cooking subsystem, a vending subsystem, a printer or copy service subsystem, or any other type of building subsystem that uses controllable equipment and/or sensors to monitor or control building 10. In some embodiments, building subsystems 428 include waterside system 200 and/or airside system 300, as described with reference to FIGS. 2-3.

Each of building subsystems 428 can include any number of devices, controllers, and connections for completing its individual functions and control activities. HVAC subsystem 440 can include many of the same components as HVAC system 100, as described with reference to FIGS. 1-3. For example, HVAC subsystem 440 can include a chiller, a boiler, any number of air handling units, economizers, field controllers, supervisory controllers, actuators, temperature sensors, and other devices for controlling the temperature, humidity, airflow, or other variable conditions within building 10. Lighting subsystem 442 can include any number of light fixtures, ballasts, lighting sensors, dimmers, or other devices configured to controllably adjust the amount of light provided to a building space. Security subsystem 438 can include occupancy sensors, video surveillance cameras, digital video recorders, video processing servers, intrusion detection devices, access control devices (e.g., card access, etc.) and servers, or other security-related devices.

Still referring to FIG. 4, BMS controller 366 is shown to include a communications interface 407 and a BMS interface 409. Interface 407 can facilitate communications between BMS controller 366 and external applications (e.g., monitoring and reporting applications 422, enterprise control applications 426, remote systems and applications 444, applications residing on client devices 448, etc.) for allowing user control, monitoring, and adjustment to BMS controller 366 and/or subsystems 428. Interface 407 can also facilitate communications between BMS controller 366 and client devices 448. BMS interface 409 can facilitate communications between BMS controller 366 and building subsystems 428 (e.g., HVAC, lighting security, lifts, power distribution, business, etc.).

Interfaces 407, 409 can be or include wired or wireless communications interfaces (e.g., jacks, antennas, transmitters, receivers, transceivers, wire terminals, etc.) for conducting data communications with building subsystems 428 or other external systems or devices. In various embodiments, communications via interfaces 407, 409 can be direct (e.g., local wired or wireless communications) or via a communications network 446 (e.g., a WAN, the Internet, a cellular network, etc.). For example, interfaces 407, 409 can include an Ethernet card and port for sending and receiving data via an Ethernet-based communications link or network. In another example, interfaces 407, 409 can include a Wi-Fi transceiver for communicating via a wireless communications network. In another example, one or both of interfaces 407, 409 can include cellular or mobile phone communications transceivers. In one embodiment, communications interface 407 is a power line communications interface and BMS interface 409 is an Ethernet interface. In other embodiments, both communications interface 407 and BMS interface 409 are Ethernet interfaces or are the same Ethernet interface.

Still referring to FIG. 4, BMS controller 366 is shown to include a processing circuit 404 including a processor 406 and memory 408. Processing circuit 404 can be communicably connected to BMS interface 409 and/or communications interface 407 such that processing circuit 404 and the various components thereof can send and receive data via interfaces 407, 409. Processor 406 can be implemented as a general purpose processor, an application specific integrated circuit (ASIC), one or more field programmable gate arrays (FPGAs), a group of processing components, or other suitable electronic processing components.

Memory 408 (e.g., memory, memory unit, storage device, etc.) can include one or more devices (e.g., RAM, ROM, Flash memory, hard disk storage, etc.) for storing data and/or computer code for completing or facilitating the various processes, layers and modules described in the present application. Memory 408 can be or include volatile memory or non-volatile memory. Memory 408 can include database components, object code components, script components, or any other type of information structure for supporting the various activities and information structures described in the present application. According to an exemplary embodiment, memory 408 is communicably connected to processor 406 via processing circuit 404 and includes computer code for executing (e.g., by processing circuit 404 and/or processor 406) one or more processes described herein.

In some embodiments, BMS controller 366 is implemented within a single computer (e.g., one server, one housing, etc.). In various other embodiments BMS controller 366 can be distributed across multiple servers or computers (e.g., that can exist in distributed locations). Further, while FIG. 4 shows applications 422 and 426 as existing outside of BMS controller 366, in some embodiments, applications 422 and 426 can be hosted within BMS controller 366 (e.g., within memory 408).

Still referring to FIG. 4, memory 408 is shown to include an enterprise integration layer 410, an automated measurement and validation (AM&V) layer 412, a demand response (DR) layer 414, a fault detection and diagnostics (FDD) layer 416, an integrated control layer 418, and a building subsystem integration later 420. Layers 410-420 can be configured to receive inputs from building subsystems 428 and other data sources, determine optimal control actions for building subsystems 428 based on the inputs, generate control signals based on the optimal control actions, and provide the generated control signals to building subsystems 428. The following paragraphs describe some of the general functions performed by each of layers 410-420 in BMS 400.

Enterprise integration layer 410 can be configured to serve clients or local applications with information and services to support a variety of enterprise-level applications. For example, enterprise control applications 426 can be configured to provide subsystem-spanning control to a graphical user interface (GUI) or to any number of enterprise-level business applications (e.g., accounting systems, user identification systems, etc.). Enterprise control applications 426 can also or alternatively be configured to provide configuration GUIs for configuring BMS controller 366. In yet other embodiments, enterprise control applications 426 can work with layers 410-420 to optimize building performance (e.g., efficiency, energy use, comfort, or safety) based on inputs received at interface 407 and/or BMS interface 409.

Building subsystem integration layer 420 can be configured to manage communications between BMS controller 366 and building subsystems 428. For example, building subsystem integration layer 420 can receive sensor data and input signals from building subsystems 428 and provide output data and control signals to building subsystems 428. Building subsystem integration layer 420 can also be configured to manage communications between building subsystems 428. Building subsystem integration layer 420 translate communications (e.g., sensor data, input signals, output signals, etc.) across a plurality of multi-vendor/multi-protocol systems.

Demand response layer 414 can be configured to optimize resource usage (e.g., electricity use, natural gas use, water use, etc.) and/or the monetary cost of such resource usage in response to satisfy the demand of building 10. The optimization can be based on time-of-use prices, curtailment signals, energy availability, or other data received from utility providers, distributed energy generation systems 424, from energy storage 427 (e.g., hot TES 242, cold TES 244, etc.), or from other sources. Demand response layer 414 can receive inputs from other layers of BMS controller 366 (e.g., building subsystem integration layer 420, integrated control layer 418, etc.). The inputs received from other layers can include environmental or sensor inputs such as temperature, carbon dioxide levels, relative humidity levels, air quality sensor outputs, occupancy sensor outputs, room schedules, and the like. The inputs can also include inputs such as electrical use (e.g., expressed in kWh), thermal load measurements, pricing information, projected pricing, smoothed pricing, curtailment signals from utilities, and the like.

According to an exemplary embodiment, demand response layer 414 includes control logic for responding to the data and signals it receives. These responses can include communicating with the control algorithms in integrated control layer 418, changing control strategies, changing setpoints, or activating/deactivating building equipment or subsystems in a controlled manner. Demand response layer 414 can also include control logic configured to determine when to utilize stored energy. For example, demand response layer 414 can determine to begin using energy from energy storage 427 just prior to the beginning of a peak use hour.

In some embodiments, demand response layer 414 includes a control module configured to actively initiate control actions (e.g., automatically changing setpoints) which minimize energy costs based on one or more inputs representative of or based on demand (e.g., price, a curtailment signal, a demand level, etc.). In some embodiments, demand response layer 414 uses equipment models to determine an optimal set of control actions. The equipment models can include, for example, thermodynamic models describing the inputs, outputs, and/or functions performed by various sets of building equipment. Equipment models can represent collections of building equipment (e.g., subplants, chiller arrays, etc.) or individual devices (e.g., individual chillers, heaters, pumps, etc.).

Demand response layer 414 can further include or draw upon one or more demand response policy definitions (e.g., databases, XML files, etc.). The policy definitions can be edited or adjusted by a user (e.g., via a graphical user interface) so that the control actions initiated in response to demand inputs can be tailored for the user's application, desired comfort level, particular building equipment, or based on other concerns. For example, the demand response policy definitions can specify which equipment can be turned on or off in response to particular demand inputs, how long a system or piece of equipment should be turned off, what setpoints can be changed, what the allowable set point adjustment range is, how long to hold a high demand set-point before returning to a normally scheduled set-point, how close to approach capacity limits, which equipment modes to utilize, the energy transfer rates (e.g., the maximum rate, an alarm rate, other rate boundary information, etc.) into and out of energy storage devices (e.g., thermal storage tanks, battery banks, etc.), and when to dispatch on-site generation of energy (e.g., via fuel cells, a motor generator set, etc.).

Integrated control layer 418 can be configured to use the data input or output of building subsystem integration layer 420 and/or demand response later 414 to make control decisions. Due to the subsystem integration provided by building subsystem integration layer 420, integrated control layer 418 can integrate control activities of the subsystems 428 such that the subsystems 428 behave as a single integrated supersystem. In an exemplary embodiment, integrated control layer 418 includes control logic that uses inputs and outputs from a plurality of building subsystems to provide greater comfort and energy savings relative to the comfort and energy savings that separate subsystems could provide alone. For example, integrated control layer 418 can be configured to use an input from a first subsystem to make an energy-saving control decision for a second subsystem. Results of these decisions can be communicated back to building subsystem integration layer 420.

Integrated control layer 418 is shown to be logically below demand response layer 414. Integrated control layer 418 can be configured to enhance the effectiveness of demand response layer 414 by enabling building subsystems 428 and their respective control loops to be controlled in coordination with demand response layer 414. This configuration may advantageously reduce disruptive demand response behavior relative to conventional systems. For example, integrated control layer 418 can be configured to assure that a demand response-driven upward adjustment to the set-point for chilled water temperature (or another component that directly or indirectly affects temperature) does not result in an increase in fan energy (or other energy used to cool a space) that would result in greater total building energy use than was saved at the chiller.

Integrated control layer 418 can be configured to provide feedback to demand response layer 414 so that demand response layer 414 checks that constraints (e.g., temperature, lighting levels, etc.) are properly maintained even while demanded load shedding is in progress. The constraints can also include set-point or sensed boundaries relating to safety, equipment operating limits and performance, comfort, fire codes, electrical codes, energy codes, and the like. Integrated control layer 418 is also logically below fault detection and diagnostics layer 416 and automated measurement and validation layer 412. Integrated control layer 418 can be configured to provide calculated inputs (e.g., aggregations) to these higher levels based on outputs from more than one building subsystem.

Automated measurement and validation (AM&V) layer 412 can be configured to verify that control strategies commanded by integrated control layer 418 or demand response layer 414 are working properly (e.g., using data aggregated by AM&V layer 412, integrated control layer 418, building subsystem integration layer 420, FDD layer 416, or otherwise). The calculations made by AM&V layer 412 can be based on building system energy models and/or equipment models for individual BMS devices or subsystems. For example, AM&V layer 412 can compare a model-predicted output with an actual output from building subsystems 428 to determine an accuracy of the model.

Fault detection and diagnostics (FDD) layer 416 can be configured to provide on-going fault detection for building subsystems 428, building subsystem devices (i.e., building equipment), and control algorithms used by demand response layer 414 and integrated control layer 418. FDD layer 416 can receive data inputs from integrated control layer 418, directly from one or more building subsystems or devices, or from another data source. FDD layer 416 can automatically diagnose and respond to detected faults. The responses to detected or diagnosed faults can include providing an alert message to a user, a maintenance scheduling system, or a control algorithm configured to attempt to repair the fault or to work-around the fault.

FDD layer 416 can be configured to output a specific identification of the faulty component or cause of the fault (e.g., loose damper linkage) using detailed subsystem inputs available at building subsystem integration layer 420. In other exemplary embodiments, FDD layer 416 is configured to provide "fault" events to integrated control layer 418 which executes control strategies and policies in response to the received fault events. According to an exemplary embodiment, FDD layer 416 (or a policy executed by an integrated control engine or business rules engine) can shut-down systems or direct control activities around faulty devices or systems to reduce energy waste, extend equipment life, or assure proper control response.

FDD layer 416 can be configured to store or access a variety of different system data stores (or data points for live data). FDD layer 416 can use some content of the data stores to identify faults at the equipment level (e.g., specific chiller, specific AHU, specific terminal unit, etc.) and other content to identify faults at component or subsystem levels. For example, building subsystems 428 can generate temporal (i.e., time-series) data indicating the performance of BMS 400 and the various components thereof. The data generated by building subsystems 428 can include measured or calculated values that exhibit statistical characteristics and provide information about how the corresponding system or process (e.g., a temperature control process, a flow control process, etc.) is performing in terms of error from its set-point. These processes can be examined by FDD layer 416 to expose when the system begins to degrade in performance and alert a user to repair the fault before it becomes more severe.

Graphical User Interfaces of the BMS Building Management System

Figure 5:
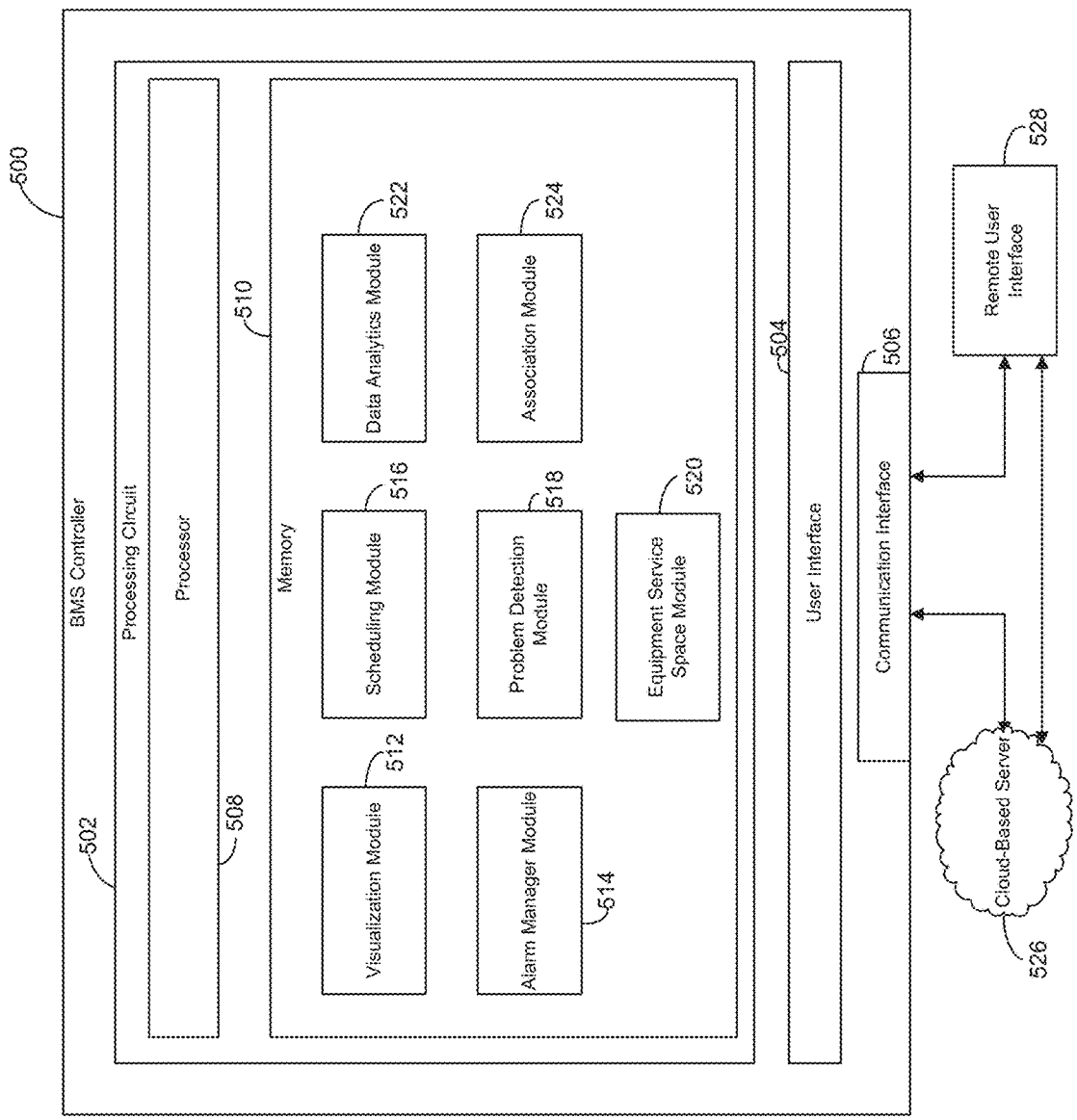
FIG. 5 is a block diagram illustrating a BMS controller associated with generating and controlling one or more graphical user interfaces (GUI), according to some embodiments.

FIG. 5 is a block diagram illustrating a BMS controller 500 associated with generating and controlling one or more graphical user interfaces. The BMS controller 500 may include a processing circuit 502, a user interface 504 and a communication interface 506. The processing circuit 502 may include a processor 508 and a memory 510. The processor 508 may be a general purpose or specific purpose processor, an application specific integrated circuit (ASIC), one or more field programmable gate arrays (FPGAs), a group of processing components, or other suitable processing components. The processor 508 may be configured to execute computer code or instructions stored in memory 510 or received from other computer readable media (e.g., CDROM, network storage, a remote server, etc.).

The memory 510 may include one or more devices (e.g., memory units, memory devices, storage devices, etc.) for storing data and/or computer code for completing and/or facilitating the various processes described in the present disclosure. The memory 510 may include random access memory (RAM), read-only memory (ROM), hard drive storage, temporary storage, non-volatile memory, flash memory, optical memory, or any other suitable memory for storing software objects and/or computer instructions. The memory 510 may include database components, object code components, script components, or any other type of information structure for supporting the various activities and information structures described in the present disclosure. The memory 510 may be communicably connected to the processor 508 and may include computer code for executing (e.g. by processor 508) one or more processes described herein.

The memory 510 may include a visualization module 512, an alarm manager module 514, a scheduling module 516, a problem detection module 518, an equipment service space module 520, a data analytics module 522, and an association module 524. The function and operation of the above described modules will be described in detail below.

The user interface 504 may be used to provide a visualization related to a BMS to a user. In one embodiment, the user interface 504 may be a touch screen interface, such as a capacitive or resistive touch screen interface. In other embodiments, the user interface 504 is a visual display in combination with an input device. Example input devices may include keyboards, keypads, switches, touch screen interfaces (e.g. capacitive or resistive), or other devices which allow a user to input data into the BMS controller 500. The user interface 504 may further be a combination of devices described above. The user interface 504 may be configured to allow a user to interface with the BMS controller 500.

The communication interface 506 may include wired or wireless interfaces (e.g. jacks, antennas, transmitters, receivers, transceivers, wire terminals, etc.) for conducting data communications with various systems, devices, or networks. For example, the communication interface 506 may include an Ethernet card and port for sending and receiving data via an Ethernet-based communications network. The communication interface 506 may be configured to communicate via local area networks or wide area networks, (e.g., the Internet, a building WAN, etc.) and may use a variety of communications protocols (e.g., BACnet, IP, LON, etc.). In one embodiment, the communication interface 506 may include one or more wireless radio transceivers. For example, the communication interface 506 may include a Wi-Fi transceiver. In other embodiments, the communication interface 506 may include other wireless transceivers, such as a LoRa transceiver, a Bluetooth transceiver, a near field communication (NFC) transceiver, a cellular transceiver (3G, 4G, LTE, CDMA), a Wi-Max transceiver, or other applicable wireless transceivers.

In one embodiment, the communication interface 506 may be configured to communicate with a cloud-based server 526. The cloud-based server 526 may include one or more databases, which can be accessed by the BMS controller 500 via the communication interface. The cloud-based server 526 may be configured to be access via an internet connection. In other examples, the cloud-based server 526 may be a dedicated cloud-based service within a BMS. The communication interface 506 may further be configured to communicate with a remote user interface 528. The remote user interface 528 may be a terminal or other device capable of accessing the BMS controller 500 via the communication interface 506. In some embodiments, the remote user interface 528 may be a user device, such as a personal computer (PC), a laptop computer, a smartphone, a tablet computer, and the like. The remote user interface 528 may further be configured to communicate the cloud-based server 526. For example, the remote user interface 528 may have an internet access which allows the remote user interface 528 to access the BMS controller 500 via the cloud-based server 526. For example, the remote user interface 528 may utilize a web-server to allow a user to interface with the BMS controller via the cloud-based server 526.

In one embodiment, the visualization module 512 may be configured to generate one or more graphical user interfaces (GUI), such as those described below. The visualization module 512 may be configured to display the generated GUIs on the user interface 504. In other embodiments, the visualization module 512 may provide the GUIs to the cloud-based server 526 where they may be displayed to a user accessing the cloud-based server 526. In some embodiments, the cloud-based server 526 may provide the generated GUIs in a web-based interface (e.g. HTML 5). Thus, a user may be able to access the GUIs using a web-browser. In some embodiments, the user may view the GUIs using a remote user interface, such as remote user interface 528.

The association module 524 may be configured to associate one or more pieces of equipment in a BMS, such as those described in FIGS. 1-4 above, with a space within the BMS. Example spaces can include a campus, a building, a zone within a building, a room within a building, or any space services by one or more pieces of BMS equipment. In one embodiment, the association module 524 is in communication with one or more databases associated with a BMS. For example, the association module 524 may access one or more databases stored in the cloud-based server 526. In one embodiment, the association module 524 may include a system configuration tool which can automatically generate associations between BMS equipment and a space. The association module 524 may make the associations at the equipment level (e.g. via attributes of the equipment objects). In one embodiment, the association module 524 performs the associations when the BMS controller 500 is in an offline condition. For example, the association module 524 may query a database within the cloud-based server instead of attempting to query all of the equipment directly. The association module 524 may include logic to automatically associate one or more pieces of BMS equipment with a given space. For example, the association module 524 may evaluate locations and data points associated with the equipment, and further evaluate which data points are associated with the space. In other embodiments, a database may include data describing which pieces of equipment service a given space, or are located within a given space. The association module 524 may extract this information to automatically associate the equipment with one or more spaces.

In one embodiment, the association module 524 may be configured to generate one or more associations between equipment and one or more schedules. The association module 524 may populate an equipment cache stored in the memory 510 with the determined relationships described above. The association module 524 may evaluate scheduling entities, such as calendar entities and schedule entities and associate them with one or more equipment entities. The schedule entities and the calendar entities may serve as containers for long living sets of information, such as weekly schedule and calendar entries. The schedule entities and calendar entities may further serve as anchors for keeping one or more attributes registered for and updated within a read attribute service cache, which may be stored in the memory 510.

Figure 6:
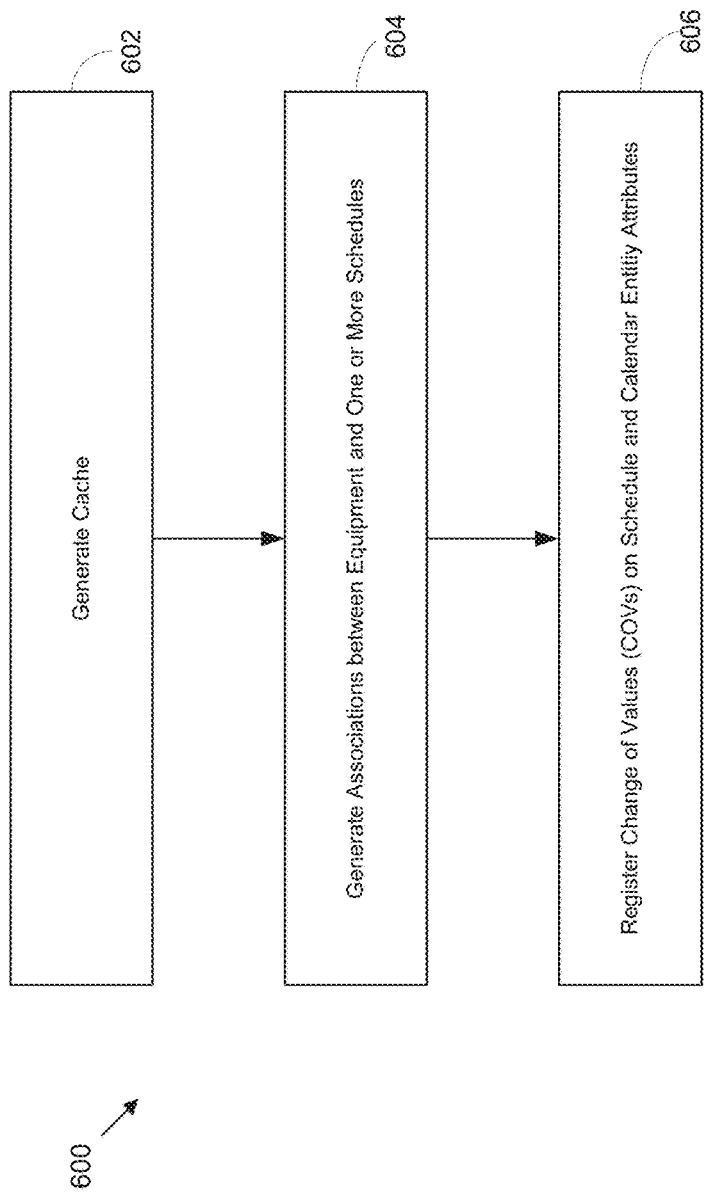
FIG. 6 is a flow chart illustrating a process 600 for generating a schedule association cache, according to some embodiments.

FIG. 6 is a flow chart illustrating a process 600 for generating a schedule association cache is shown. At process block 602, the cache is generated based on information provided by the above described system configuration tool. In one embodiment, the system configuration tool may be within the association module 524. In other embodiments, the system configuration tool may be external to the BMS controller 500, such as in the cloud-based server 526 and/or the remote user interface 528. For example, a user may be able to access the system configuration tool via the cloud-based server 5226 using the remote user interface 528. The cache may further be populated with additional information required to create the equipment associations. The additional information may include equipment location, equipment data points, system layouts, etc.

At process block 604, associations between the BMS equipment and one or more schedules are generated. In one example, the association module 524 may automatically generate the associations based on the information in the cache generated at process block 602. Finally, at process block 604, changes of values (COVs) associated with the schedule entities and the calendar entities are registered.

The following figures relate to various graphical user interfaces (GUI) provided by the BMS controller 500. In one embodiment, the BMS controller 500 generates the various graphical user interfaces via the visualization module 512. The visualization module 512 may use a web-server to generate the graphical user interfaces in a web-page (i.e. HTML5) format. Alternatively, the visualization module 512 may include a dedicated device running software associated with the graphical user interface. Where the graphical user interfaces are generated using a web-server, the graphics, as well as the associated user interfaces may not require any software or plugin to be installed on a client device, such as remote user interface 528. In one embodiment, the visualization module 512 can provide the same graphic to multiple client devices, regardless of the client device type.

Figure 7:
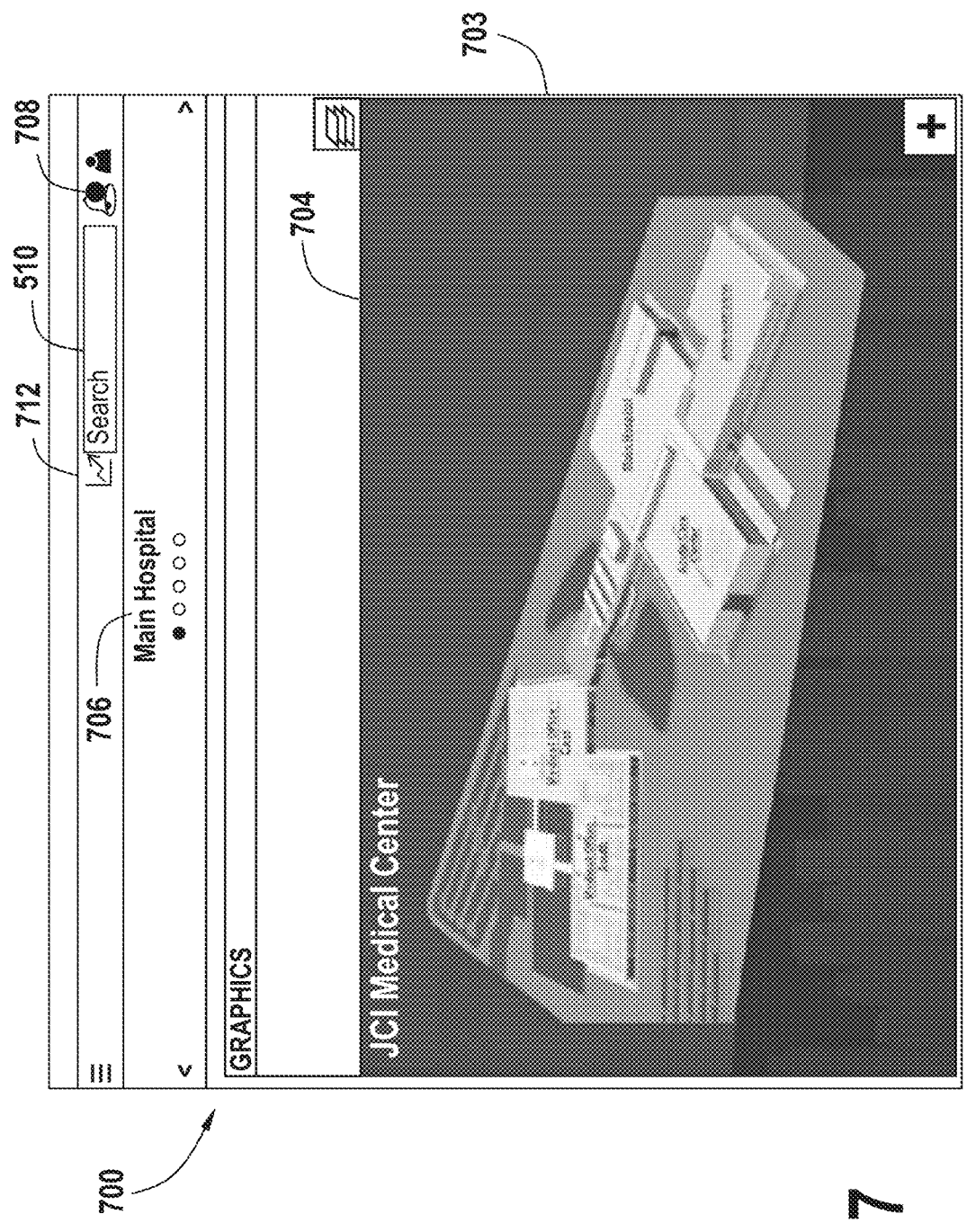
FIG. 7 is an illustration of a facility-wide overview GUI, according to some embodiments.

Referring now to FIG. 7, a facility-wide overview GUI 700 is shown, according to one embodiment. The facility-wide overview GUI 700 may include a visual representation 702 of an entire facility or campus. The facility-wide overview GUI 700 may include multiple independent buildings that a user can select within the visual representation 702. The facility-wide overview GUI 700 may further include general facility data 704. For example, outside temperature and humidity may be possible general facility data 704 that can be displayed in the facility-wide overview GUI 700. Further, the facility-wide overview GUI 700 may include a facility selection tool 706. The facility selection tool 706 may be configured to allow a user to switch between multiple facilities. In one embodiment, the facility selection tool 706 can include multiple arrows or other selection devices that can allow the user to scroll through multiple facilities. In one example, each of the available facilities may be controlled by a single BMS controller, such as BMS controller 500. However, in other examples, each available facility may be controlled by one or more BMS controllers 500.

The facility-wide overview GUI 700 may further include an alarm indicator 708, a search bar 710 and a trend data icon 712. In one embodiment, the alarm indicator 708 provides an alert to the user that an alarm is present in the facility shown in the visual representation 702. However, in other embodiments the alarm indicator 708 may provide an indication to the user that an alert has occurred in one or more of the available facilities. The user can select the alarm indicator 708, which may activate an alarm summary GUI, as described in more detail below. The search bar 710 allows a user to type in a search to the facility-wide overview GUI 700. In one embodiment, the search bar 710 can be used to search for any building, floor, room, or device in a BMS, such as BMS 400. In one embodiment, the search bar 710 can allow for natural language searching to allow for easier access to the search functionality of the facility-wide overview GUI 700 for users unfamiliar with the BMS. Further, in some embodiments, a user may be able to use the search bar 710 to search for tutorials, help functions, user manuals, etc. associated with the facility-wide overview GUI 700 and/or the BMS. In one embodiment, the search bar 710 is limited to items located within the particular GUI. For example, the search bar 710 in the facility-wide overview GUI 700 may search all items within the displayed facility. However, in other embodiments, the search bar 710 may provide a search of all the available facilities. Finally, the trend data icon 712 can be selected by a user to bring up a trend data GUI, discussed in more detail below.

While the alarm indicator 708, the search bar 710 and the trend data icon 712 are discussed in context of the facility-wide overview GUI 700, these features may be present within multiple GUIs, as will be seen in the following figures. Unless discussed otherwise, it is to be understood that the functionality of the alarm indicator 708, the search bar 710, and the trend data icon 712 is similar for each GUI.

Figure 8:
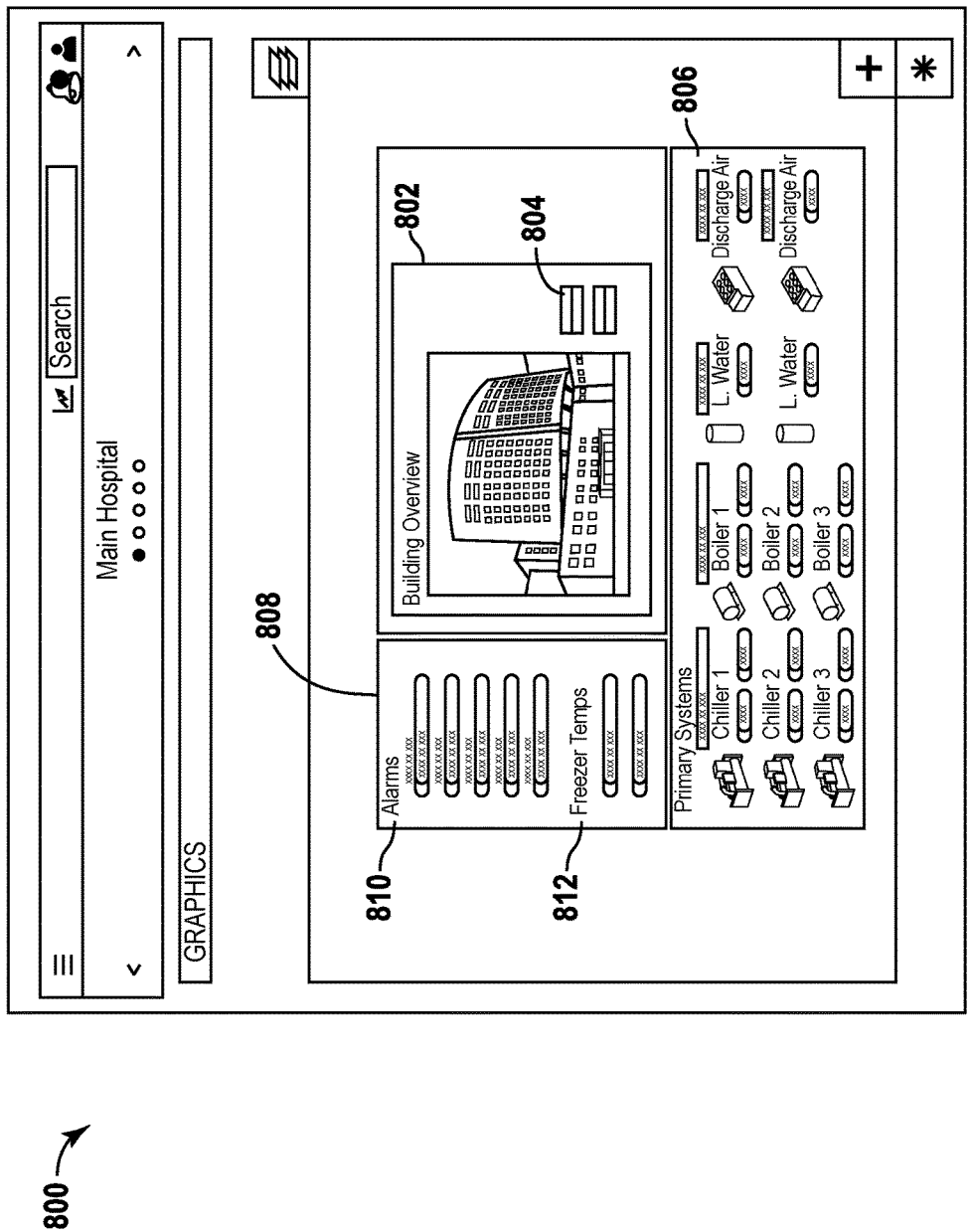
FIG. 8 is an illustration of a building-wide overview GUI, according to some embodiments.

Turning now to FIG. 8, a building-wide overview GUI 800 is shown, according to one embodiment. The building-wide overview GUI 800 can provide a building overview interface 802 of the building referenced in the building-wide overview GUI 800. In one embodiment, the building is a building selected from the facility-wide overview GUI 700 described above. The building overview interface 802 can include a building floor listing 804. The building floor listing 804 may provide an indication of data associated with each floor within the building. For example, the building floor listings 804 may provide an indication of alarms, equipment, rooms, etc., for each floor within the building. In one embodiment, a user can select one or more of the floors listed in the building floor listing 804 to access a GUI associated with the selected floor, as will be discussed in more detail below.

The building-wide overview GUI 800 may further include a primary systems interface 806. The primary systems interface 806 can provide a visual representation of the primary systems and associated equipment associated with the building. Example primary systems can include HVAC systems chiller plants, central heating systems, heat exchanges, air handling units (AHUs), etc., as well as other building systems such as lighting, water quality, etc. In one embodiment, the primary systems interface 806 provides a status for each of the systems and the associated equipment. For example, the primary systems interface 806 may provide an on or off status for the chillers associated with the central chiller plant, and the boilers associated with the central heating system. In other examples, information such as water temperature at the output of the heat exchanges or discharge air temperatures for air handling units may further be displayed. In one embodiment, a user can select one of the individual primary systems or an individual device to access a GUI associated with that system or device, as will be described in more detail below.

The building-wide overview GUI 800 may further include a summary window 808. In one embodiment, the summary window 808 is a customized summary created to provide a user with quick access to important information relating to the building. For example, the summary window 808 of FIG. 6 is shown to include a number of alarms 810 and a number of freezer temperatures 812. In one embodiment, a user can select any of the alarms 810 or the freezer temperature 812 to access a GUI associated with the individual alarm or device, as will be described in more detail below. In a further example, the summary window 808 may be dynamically generated by the visualization module 512 to display the most relevant data. For example, active alarms, or systems/device designated within the BMS controller 500 as critical may be automatically displayed in the summary window 808.

Figure 9:
FIG. 9 is an illustration of a floor-wide overview GUI, according to some embodiments.

Turning now to FIG. 9, a floor-wide overview GUI 900 is shown, according to one embodiment. The floor wide overview GUI 900 includes a floor overview interface 902. In one example, the floor displayed in the floor overview interface 902 is a floor selected from the building-wide overview GUI 800 described above. In one embodiment, the floor overview interface 902 displays a number or rooms and systems associated with the floor. In one example, data may be displayed that is associated with each room on the floor. For example, each room displayed in the floor overview interface 902 may have an associated temperature of the room displayed. However, other information such as active alarms, temperature set points, abnormal temperatures, etc. may also be displayed. In one embodiment, a representation of the ductwork associated with the floor may be displayed. A device listing 904 may also be provided on the floor overview interface 902. The device listing 904 may provide a list of all systems or devices located on the floor. In other examples, the device listing 904 may provide a list of all systems or devices that provide service to the floor.

Figure 10:
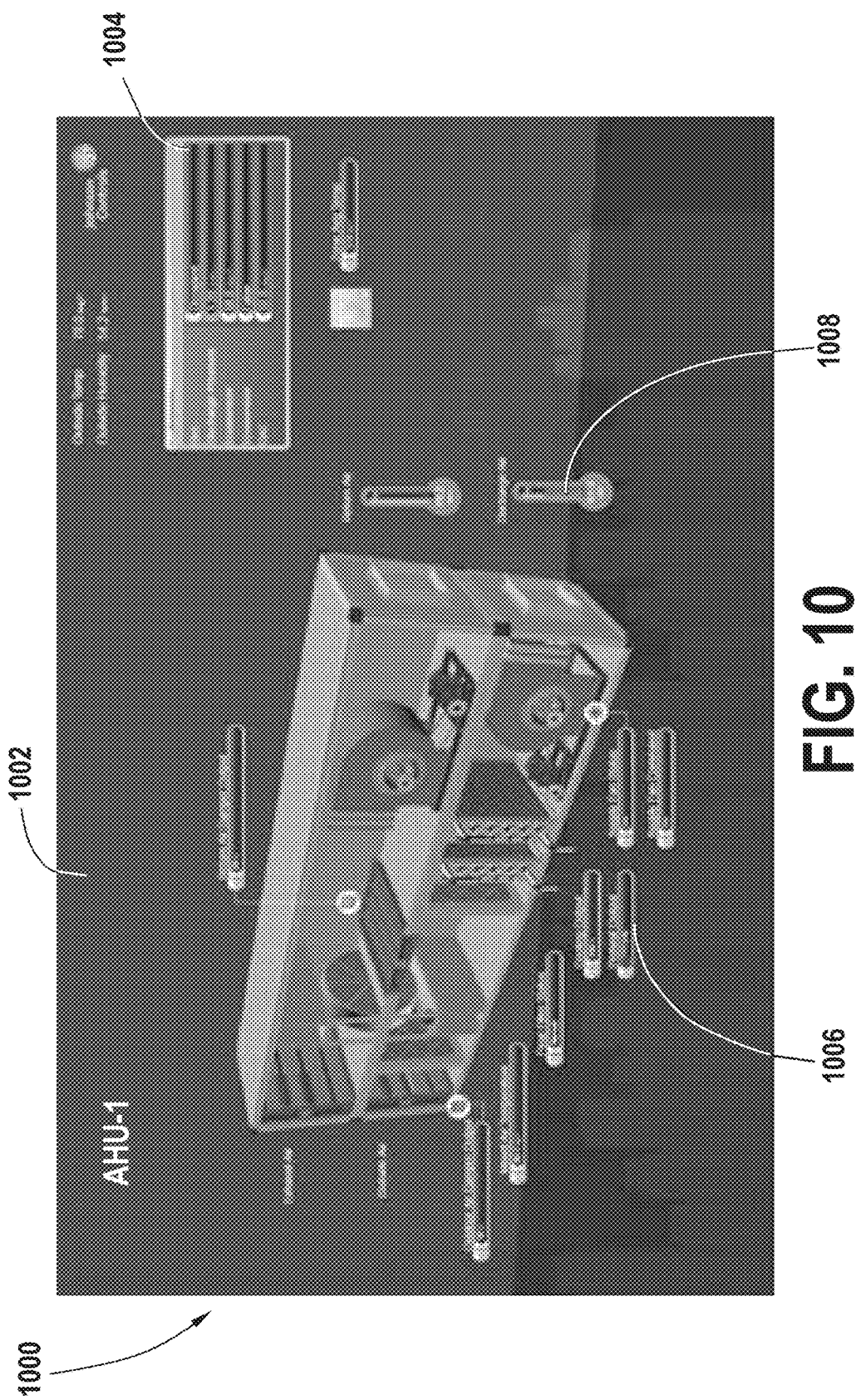
FIG. 10 is an illustration of a system-wide overview GUI, according to some embodiments.

Turning now to FIG. 10, a system-wide overview GUI 1000 is shown, according to one embodiment. The system-wide overview GUI 1000 includes a system overview interface 1002. In one example, the system displayed in the system overview interface 1002 is a system selected from the floor-wide overview GUI 900 described above. However, the system displayed in the system overview interface 1002 may be a system selected in the building-wide overview GUI 800 or the facility-wide overview GUI 700. The system overview interface 1002 may include a system summary display 1004. In one embodiment, the system summary display 1004 displays one or more settings associated with the system. For example, settings such as setpoint temperatures, airflows, operating times, etc. may be displayed in the system summary display 1004. Further, one or more device status indicators 1006 may be displayed in the system overview interface 1002. In one embodiment, a user can select one or more of the device status indicators 1006 to generate a detailed device GUI relating to the selected device status. The system overview interface 1002 may further include one or more system status indicators 1008. The system status indicators 1008 can provide various system based status information to a user. In one example, the system status indicators 1008 can provide status information such as intake air temperature, discharge air temperature, intake water temperature, discharge water temperature, fan speed, etc.

Figure 11:
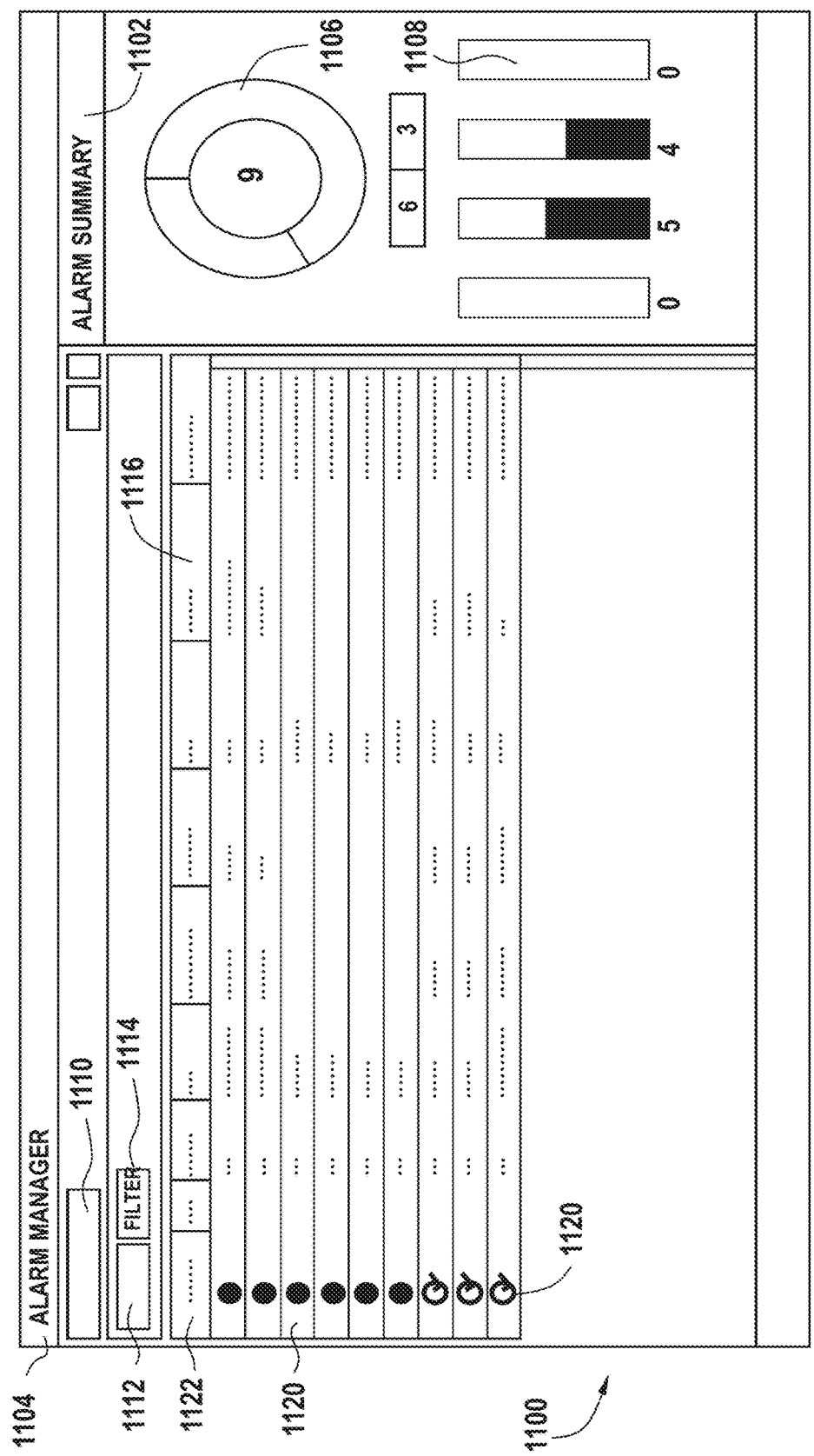
FIG. 11 is an illustration of an alarm manager GUI showing a one week schedule, according to some embodiments.

Turning now to FIG. 11, an alarm manager GUI 1100 is shown, according to one embodiment. In one embodiment, the alarm manager module 514 is configured to process alarm data within a BMS associated with the BMS controller 500. The alarm manager module 514 may further be configured to provide the alarm data to the visualization module 512. Upon receiving the alarm data from the alarm manager module 514, the visualization module 512 may display the alarm data via the alarm manager GUI 1100. In one embodiment, the alarm manager GUI 1100 is accessed by selecting an alarm indicator, such as alarm indicator 708 described above. In other embodiments, the alarm manager GUI 1100 can be accessed in any of the GUIs described in FIGS. 7-10. The alarm manager GUI 1100 may include an alarm summary display 1102 and an alarm manager interface 1104. The alarm summary display 1102 can provide a general overview of the pending alarms within the BMS. In one embodiment, the alarm summary display 1102 can include a pending alarm status graphic 1106. The pending alarm status graphic 1106 may display the total number of faults, as well as provide an indication as to the number of acknowledged faults and unacknowledged faults. The indication may be a basic text indication, a graphical indication, or a combination thereof. The alarm summary display 1102 may further include an alarm priority status graphic 1108. The alarm priority status graphic 1108 may divide the current number of active faults into different priority levels. The alarm priority status graphic 1108 may use graphics to illustrate the distribution of faults by priority.

The alarm manager interface 1104 includes an alarm summary indicator 1110, an actions menu selection box 1112, a filter input 1114, a sorting bar 1116 and a detailed fault display 1118. The alarm summary indicator 1110 provides a quick indication of the number of outstanding alarms. In one embodiment, the alarm summary indicator 1118 may provide a color indication when there are unacknowledged alarms. For example, the alarm summary indicator 1118 may be displayed in red where there are unacknowledged alarms, yellow when there are only acknowledged alarms, and green when there are no pending alarms. The actions menu selection box 1112 can allow a user to access a menu of possible actions that can be performed. For example, the actions menu selection box 1112 may include options such as acknowledge, un-acknowledge, clear, and/or prioritize. However, other options are considered. The filter input 1114 allows a user to be able to filter the faults listed in the alarm summary indicator 1118. In one embodiment, the filter input 1114 allows a user to filter the alarms in the alarm summary indicator 1118 using one or more filtering categories. Example filtering categories include priority, date, status, location, device, device name, zone, etc.

The sorting bar 1116 provides a heading for the alarm summary indicator 1118, describing what each of the items in the alarm summary indicator 1118 describes. Example headings include status, new, priority, alarm type, alarm value, equipment type, equipment name, zone, date of alarm, etc. A user can sort the alarm summary indicator 1110 by selecting one of the heading in the sorting bar 1116, which will organize the listed alarms according to the selected heading. The alarm summary indicator 1118 can provide data associated with each alarm. For example, the alarm summary indicator 1118 can provide status information, whether the alarm is "new," alarm priority, alarm type, alarm value, equipment type, equipment name, zone, date of alarm etc. By graphically displaying the alarm information, a user can quickly understand what component within the BMS is causing the alarm condition. In one embodiment, the alarm manager GUI 1100 can use the alarm summary indicator 1118 to display alarms from upstream equipment (i.e. equipment associated with a subsystem being viewed). In one embodiment, a flashing indicator can be provided in the "new" column, indicating that the alarm is new.

The alarm summary indicator 1118 can further include a selection box 1120 for each row (i.e. each alarm). A user can select the selection box 1120 associated with an alarm and subsequently select the actions menu selection box 1112 to perform a certain action on the selected alarm. In one example, the user can select as many selection boxes 1120 as desired to allow for bulk processing of alarms. In one example, the sorting bar 1116 include a select all box 1122 which can be selected by a user to allow for bulk actions to be taken on the listed alarms. A menu selection button 1124 may further be located on the alarm manager interface 1104 (or within the alarm manager GUI 1100 in general) allowing a user to select other display options. In one embodiment, the alarm manager GUI 1100 may group occurrences of alarms (i.e. group specific alarms together, regardless of occurrence time) so that all occurrences of a particular alarm may be viewed and/or managed together. Allowing group managing of the alarms may allow for quick clearing of nuisance alarms.

In one embodiment, the menu selection button 1124 may allow a user to generate an alarm report. FIG. 12 illustrates an exemplary alarm report 1200. The alarm report 1200 can include information about each of the pending alarms. As shown in the alarm report 1200, the information can include: alarm priority, "new" status, alarm type, trigger value, equipment type, equipment name, space (location), occurrence time, etc. In one embodiment, the report provides the same information as shown in the alarm manager interface 1104, described above. In other embodiments, a user may be able to customize the alarm report 1200 to provide more or less information. In some embodiment, the alarm report 1200 may output statistics associated with one or more of the alarms.

Figure 13:
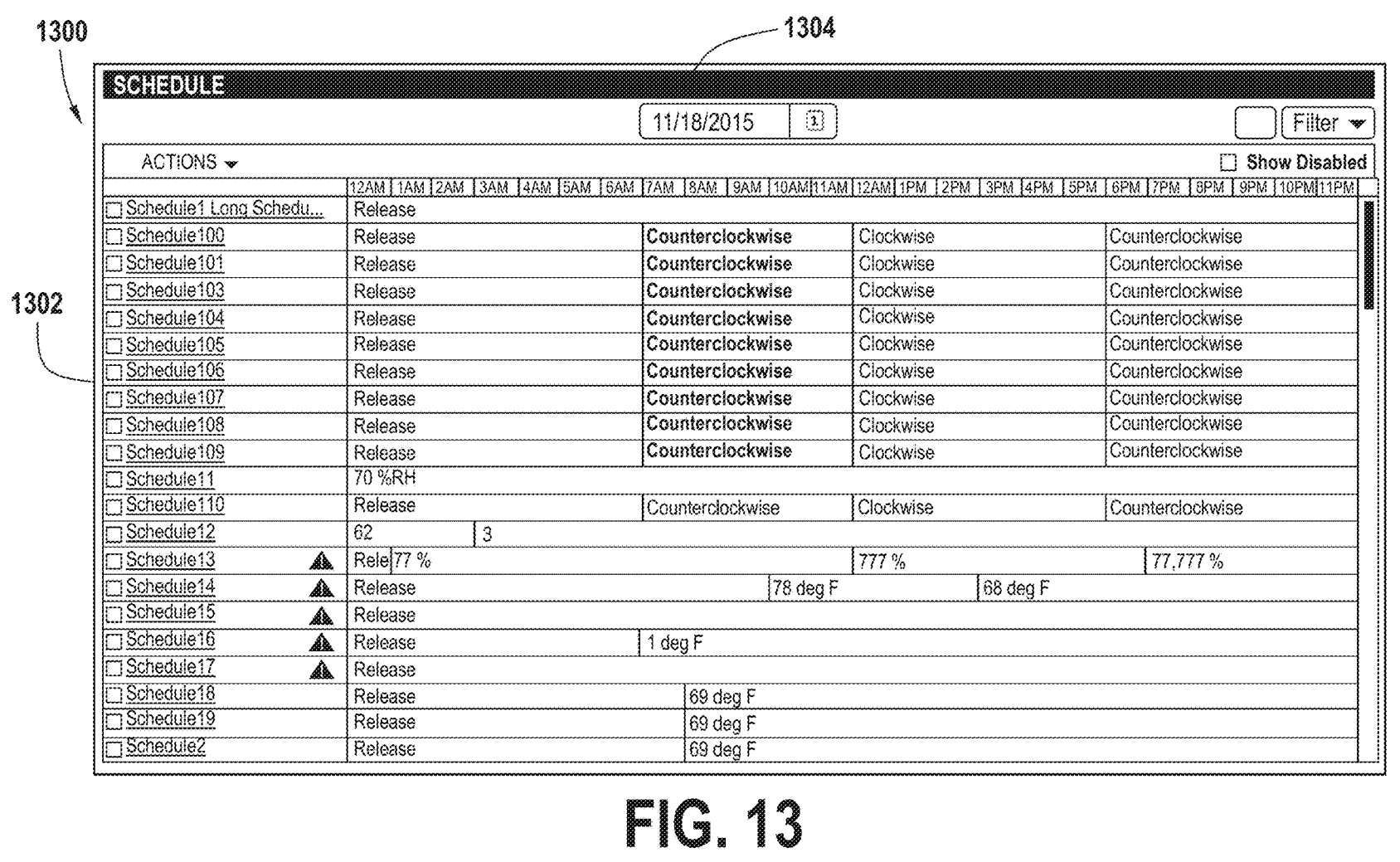

Turning now to FIG. 13 a scheduling overview GUI 1300 is shown, according to one embodiment. The scheduling overview GUI 1300 can display multiple schedules associated with a BMS. In one embodiment, the scheduling module 516 may be configured to generate one or more schedules based on an input from a user. The scheduling module 516 may further be configured to provide the scheduling data to the visualization module 512, which can then visualize the schedule for a user. For example, the scheduling overview GUI 1300 may display schedules associated with a space, such as an entire facility, building, floor, room and/or individual systems or equipment associated with the space. The schedules may include operations, setpoints, or other information associated with equipment or systems associated with the space. Example operations may include damper positions, AHU and VAV operations, shade positions, lighting operations (e.g. on or off), and the like. Example setpoints may include temperature setpoints, humidity setpoints, motor speeds, fan speeds, etc.

The scheduling overview GUI 1300 can include a schedule list interface 1302. The schedule list interface 1302 can list all of the pending schedules associated with a given facility, building or floor. Further, the schedule list interface 1302 can further display the actions associated with each schedule over a period of time. In one example, the scheduling overview GUI 1300 can include a date selection interface 1304. The date selection interface 1304 can allow a user to view all schedules associated with the selected date on the schedule list interface 1302. In one embodiment, the date selection interface 1304 can be used to show a schedule associated with all or a portion of the BMS in the future or in the past. The scheduling overview GUI 1300 can further include a filter menu button 1306. The filter menu button 1306 can allow a user to filter the schedules displayed in the schedule list interface 1302.

Figure 14:
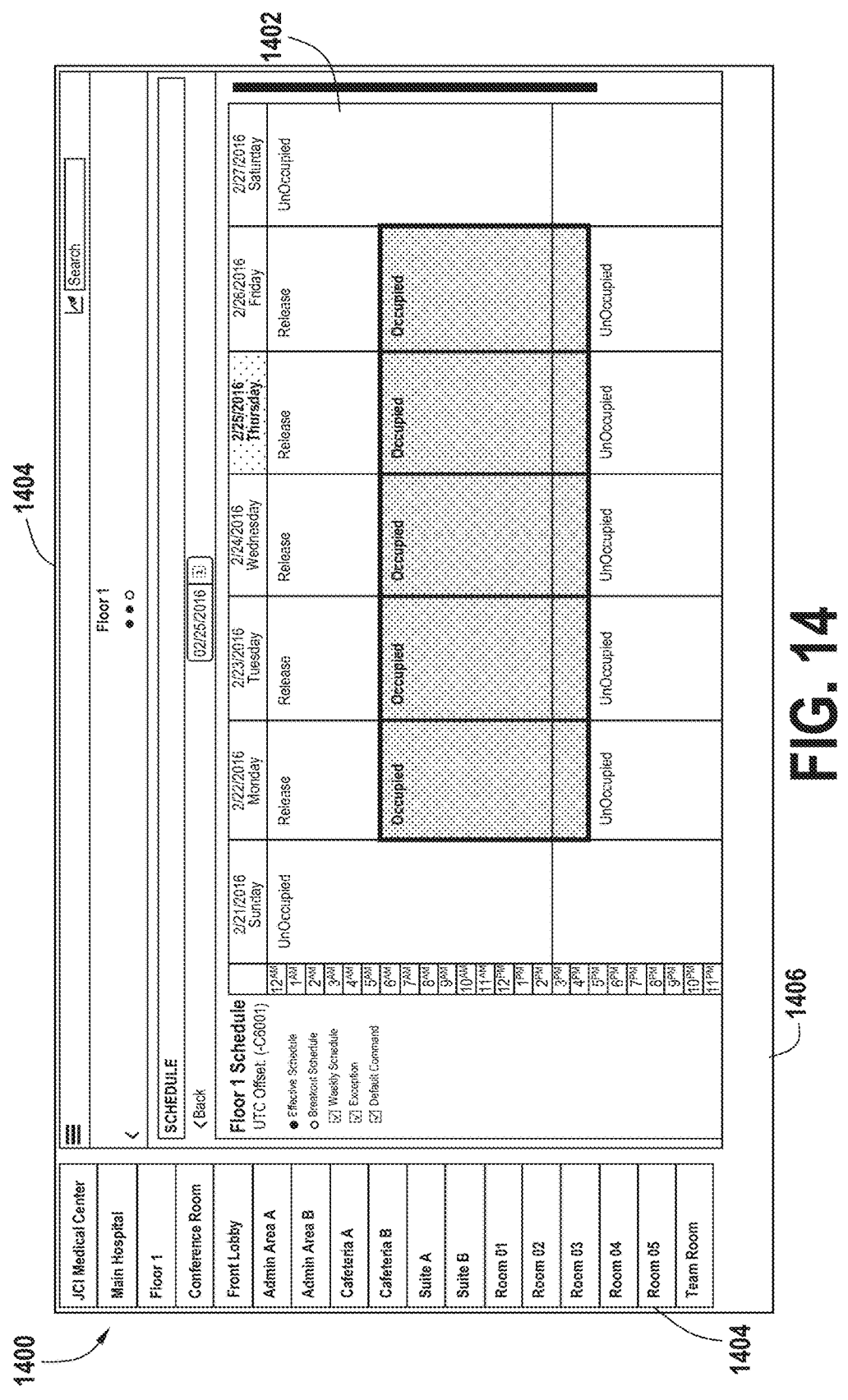

Turning now to FIG. 14, a location schedule GUI 1400 is shown, according to one embodiment. In one embodiment, the location schedule GUI 1400 is accessed by selecting one of the schedules listed in the scheduling overview GUI 1300. Alternatively, a user may access the location schedule GUI 1400 by searching for the specific location using a search function, such as that described in FIG. 7, above. For example, the user may type "Floor 1" into a search box, select the proper floor, and then view the schedule. In one example, the location schedule GUI 1400 can include a schedule view 1402. In one embodiment, the schedule view 1402 can be displayed as a weekly calendar view. However, other views are considered, such as a daily view, a monthly view, or a yearly view. The schedule view 1402 can provide details regarding the schedule. For example, the schedule view 1402 can indicate when a given location is planned on being occupied or not occupied. In one embodiment, the status of the given location in the schedule can be color coded. Similar to the scheduling overview GUI 1300, the location schedule GUI 1400 may include a date selection interface 1404, which can allow a user to input a date directly into the location schedule GUI 1400. In one embodiment, the date selection interface 1404 allows a user to select a date in the future or in the past to view the associated schedule for the selected location. The schedule view 1402 can further include a schedule detail interface 1406. In one embodiment, the schedule detail interface 1406 allows a user to select the level of detail desired to be displayed in the schedule view 1402. For example, a user can select to view the schedule as an effective schedule, or as a breakout schedule using the schedule detail interface 1406. The schedule detail interface 1406 can further allow for additional detail to be selected within a schedule type. For example, where a user selects to view the schedule as a breakout schedule, the user may further be able to select options such as whether to view the breakout schedule as a weekly schedule, whether to show exceptions to the schedule, or whether to show one or more default commands using the schedule detail interface 1406.

In some embodiments, the location schedule GUI 1400 can further include location selection tree 1408. The location selection tree 1408 may allow for a user to further find schedules associated with progressively lower levels of the BMS. For example, the schedule displayed in FIG. 14 is related to "Floor 1." Using the location selection tree 1408, a user can then select rooms located on "Floor 1," and thereby view their associated schedules, as will be described in more detail below.

Figure 15:
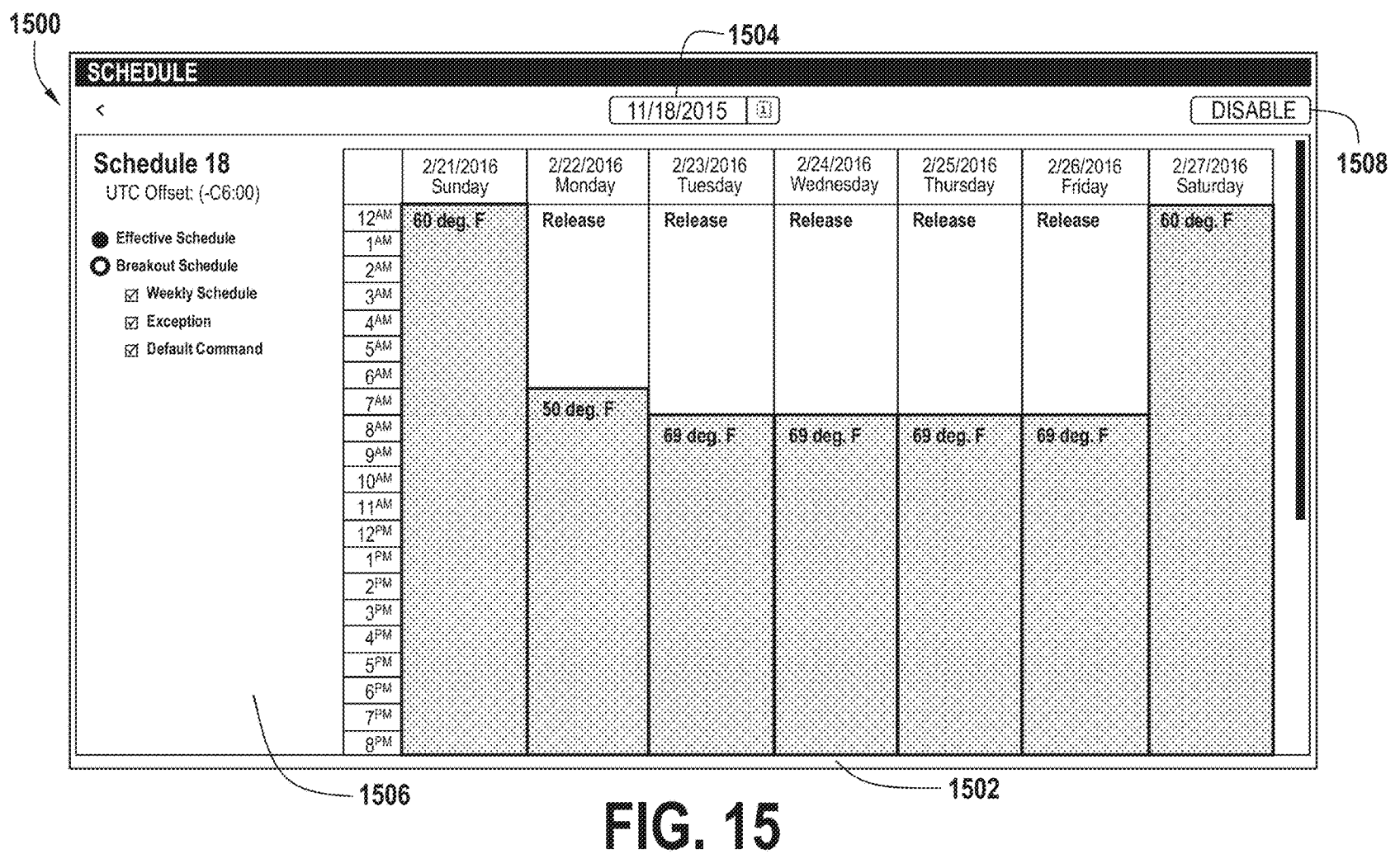

Turning now to FIG. 15, an room effective schedule GUI 1500 is shown, according to one embodiment. Similar to the location schedule GUI 1400 described above, the room effective schedule GUI 1500 can include a schedule view 1502, a date selection interface 1504 and a schedule detail interface 1506. The schedule view 1502, the date selection interface 1504 and the schedule detail interface 1506 may have the same functionality as the schedule view 1402, the date selection interface 1404 and the schedule detail interface 1406 described above. For example, the schedule view 1502 may show the schedule for the selected room in a calendar format. In one embodiment, the room effective schedule GUI 1500 includes a disable button 1508. The disable button 1508 can override the schedule for the selected space (e.g. room, floor, building or campus). In one example, selecting the disable button 1508 may bring up a menu allowing a user to select options associated with overriding the schedule. For example, the user may be able to override the schedule completely, for a set period of time, for a user defined period of time, for certain calendar days, etc. As shown in FIG. 15, the schedule view 1502 is displaying an effective schedule, as selected in the schedule detail interface 1506.

Figure 16:
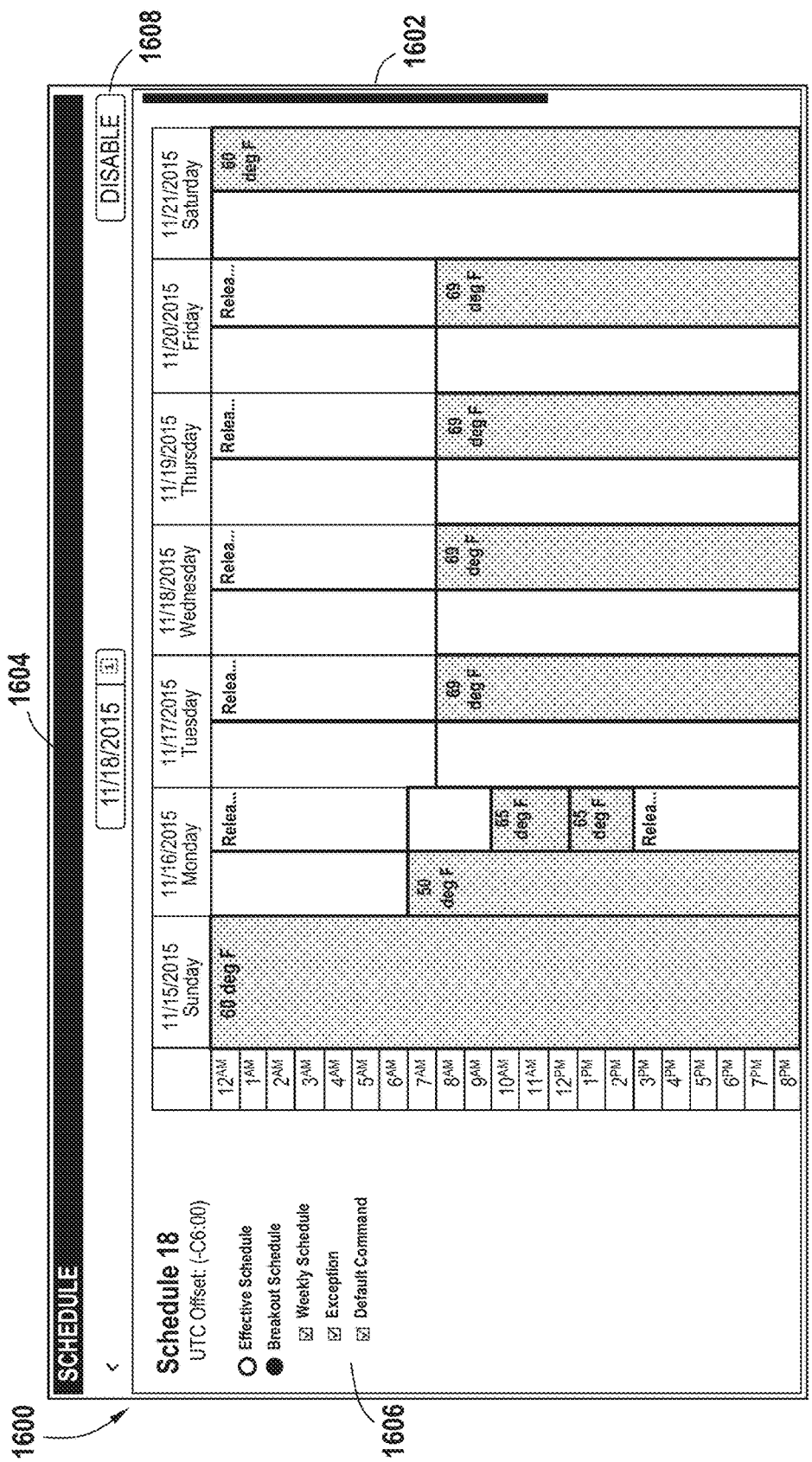
FIG. 16 is an illustration of a room breakout schedule GUI, according to some embodiments.

Turning now to FIG. 16, a room breakout schedule GUI 1600 is shown, according to one embodiment. Similar to the room effective schedule GUI 1500 described above, the room breakout schedule GUI 1600 can include a breakout schedule view 1602, a date selection interface 1604, a schedule detail interface 1606 and a disable button 1608. The breakout schedule view 1602, the date selection interface 1604, the schedule detail interface 1606, and the disable button 1608 may have the same functionality as the schedule view 1502, the date selection interface 1504, the schedule detail interface 1506, and the disable button 1508 as described above. The breakout schedule view 1602 can display the same schedule as shown in FIG. 14 in breakout form. As shown in the breakout schedule view 1602, the weekly schedule is shown, along with exceptions and default commands, as selected in the schedule detail interface 1606. This can provide a detailed view of a room schedule to a user quickly allowing the user to quickly determine if changes are necessary.

Figure 17:
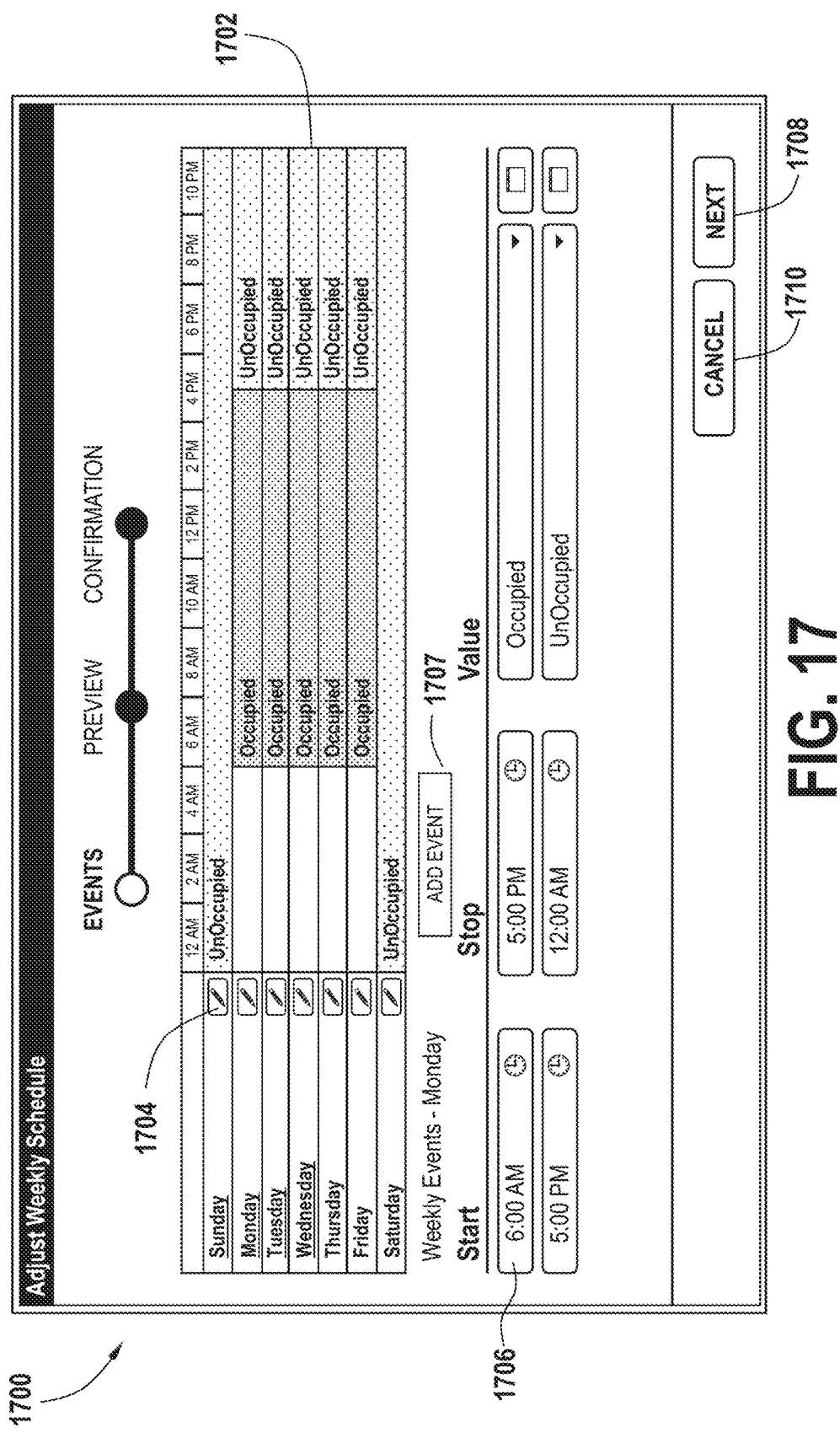
FIG. 17 is an illustration of a schedule modification GUI, according to some embodiments.

Turning now to FIG. 17, a schedule modification GUI 1700 is shown. In one embodiment, the schedule modification GUI 1700 can be accessed by a user selecting an event or schedule within a schedule view, such as those described in FIGS. 13-16, above. The schedule modification GUI 1700 may allow a user to modify a schedule for a specific location, such as a building, a floor, or a room. The schedule modification GUI 1700 includes a schedule view interface 1702. The schedule view interface 1702 includes a number of schedule edit buttons 1704. The schedule edit buttons 1704 may be associated with each day of the week shown in the schedule view interface 1702. However, in some embodiments, there may be a schedule edit button 1702 associated with each listed schedule displayed in the schedule view interface 1702. Selecting a schedule edit button 1704 can allow a user to modify the selected schedule using a schedule edit interface 1706. The schedule edit interface 1706 can allow a user to select a start and stop time for one or more values for each schedule. In one example, such as where the schedule is a building schedule, a user may be able to select start and stop times that the building is either expected to be occupied or unoccupied. The ability to quickly modify a schedule for a building is beneficial where the building experiences an unplanned change in occupancy. For example, when the building may be unoccupied due to weather, such as a snow emergency. By allowing the schedule to be modified on a building level, the schedules associated with rooms and floors within the building being occupied or unoccupied can be automatically modified based on the building schedule. The schedule modification GUI 1700 may further include an Add Event button 1707. The Add Event button 1707 may allow a user to add a new event to an existing schedule. In one embodiment, the user may add a new event after selecting the Add Event button 1707 by entering the event information into the schedule edit interface 1706. In some examples, additional modification selections may be available in the schedule edit interface 1706 when a new event is added, such as an ability to name the event, as well as setting certain parameters associated with the new event. For example, parameters associated with the new event may include priority, downstream equipment affected, etc. Once the schedule has been modified, a user can select the next button 1708. However, if the user does not wish to modify the schedule, the user can select the cancel button 1710.

Figure 18:
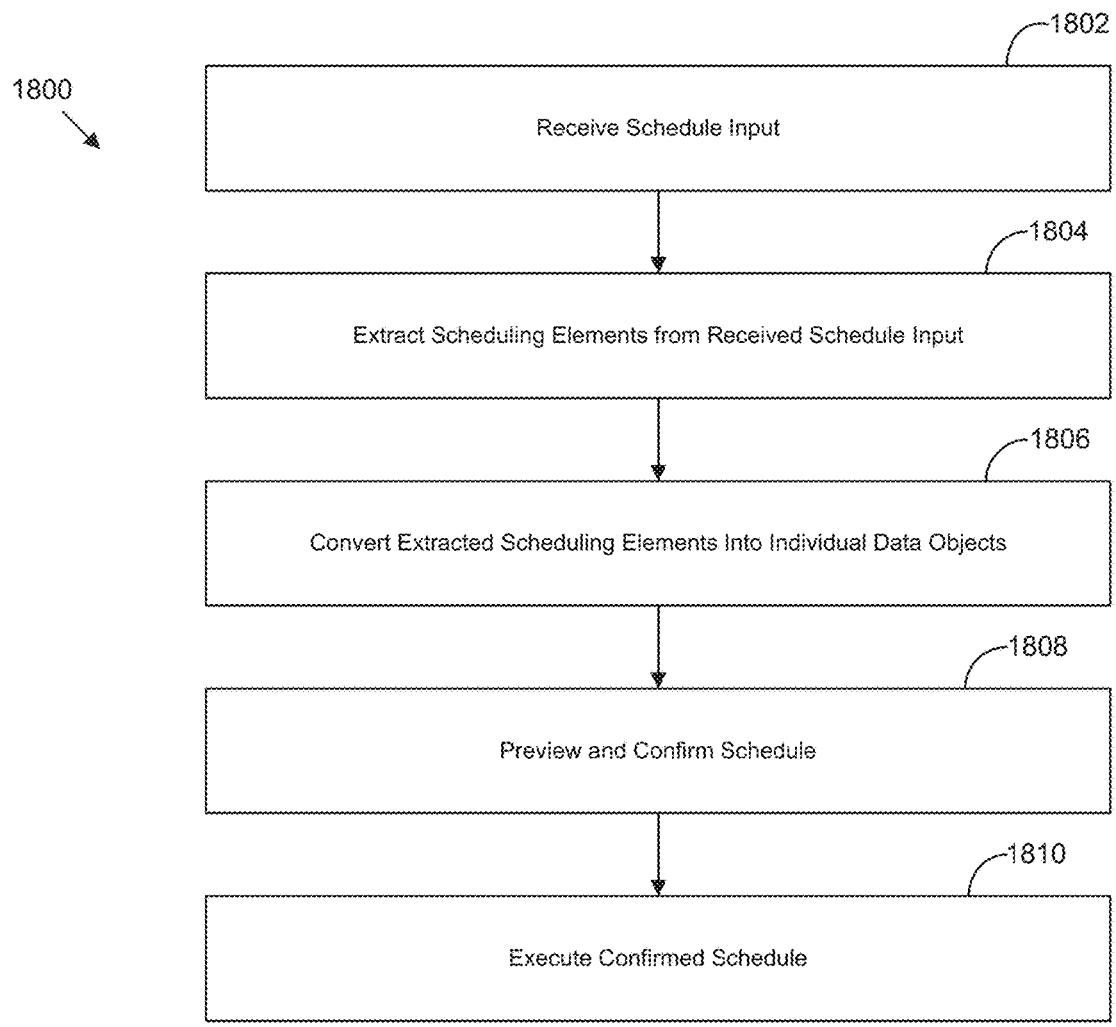
FIG. 18 is a flow chart illustrating a process for processing a schedule modification or creation request, according to some embodiments.

Turning now to FIG. 18, a process 1800 for processing a schedule modification or creation request is shown, according to some embodiments. In one embodiment, the process 1800 is processed by the BMS controller 500, and specifically by the scheduling module 516. However, other controllers or devices may be used to enact the process 1800. At process block 1802, the BMS controller 500 receives a scheduling input. The scheduling input may be provided using the user interface 504. In other embodiment, the scheduling input may be provided via the remote user interface 528. As described above, the scheduling input may be input via the schedule modification GUI 1700. The scheduling input may be a request to initiate a new schedule, to add an event to a current schedule, or to modify an existing schedule, as described above. The scheduling input may include multiple data elements, such as effective period elements, weekly schedule elements, exception schedule elements, calendar entries elements, default schedule command elements, or other elements.

At process block 1804, the scheduling module 516 and/or the BMS controller 500 extracts the schedule elements from the received schedule input. As stated above, the schedule elements may include effective period elements, weekly schedule elements, exception schedule elements, calendar entries elements, default schedule command elements, or other elements. These elements are described in more detail in regards to FIG. 19, discussed below. In some embodiments, the scheduling module 516 and/or the BMS controller 500 can parse the received scheduling input to extract the scheduling elements. In other embodiments, one or more plug-ins may be installed on the BMS controller 500 and used by the scheduling module 516 to extract the data from the scheduling input. Plug-ins can allow multiple scheduling systems to potentially be used by the user to establish the schedule. For example, some plug-ins may be used to allow for the scheduling module 516 to extract data from well-known scheduling systems, such as Microsoft® Outlook®.

Once the scheduling elements have been extracted at process 1804, the extracted scheduling elements are converted into individual data objects at process block 1806. In one embodiment, the extracted elements are converted into individual data objects that are data objects readable by a BMS system. For example, the individual data objects may be BACnet data objects. In some embodiments, the individual data objects are BACnet command objects. The BACnet command objects may be used to control the operation of one or more BMS devices based on the schedule.

Figure 19:
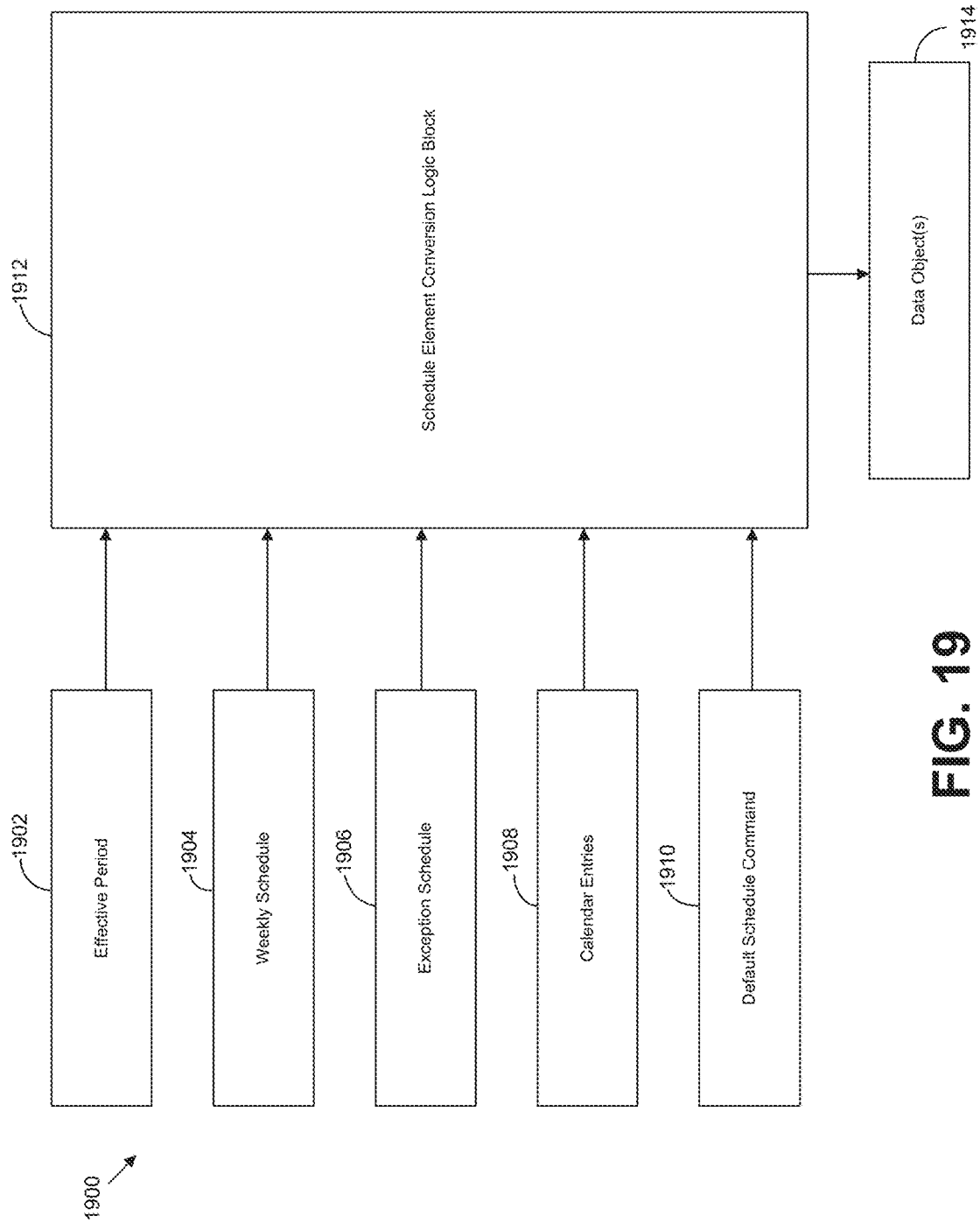
FIG. 19 is a block diagram illustrating a system 1900 for converting extracted schedule elements into data objects, according to some embodiments.

Turning briefly now to FIG. 19, a block diagram illustrating a system 1900 for converting the extracted schedule elements into data objects is shown, according to one embodiment. The system 1900 is one example system for converting schedule elements into data objects. However, other methods and systems for converting schedule elements into data objects are also contemplated. In one embodiment, the system 1900 is associated with the scheduling module 516. The systems shows an effective period element 1902, a weekly schedule element 1904, an exception schedule element 1906, a calendar entry element 1908, and a default schedule command element 1910. The schedule elements 1902-1910 are inputs to a schedule element conversion logic block 1912, which outputs one or more data objects 1914, as described above.

The effective period element 1902 determines when a given schedule is active (e.g. over what time period). The effective period element 1902 may include a start date and an end date. In other examples, the effective period element 1902 may include ranges of activity (i.e. days/months/years, etc.) The effective period element 1902 may also include times of a day in which the schedule is active. The weekly schedule element 1904 may include a weekly schedule which may drive what actions are taken (e.g. when a command object is sent, and at what value), and when the weekly schedule may cede control back to a default schedule command element 1910. The weekly schedule element 1904 may be similar to the effective period element 1902, as the weekly schedule element 1904 may have variations in the schedule based on the day of the week. However, the weekly schedule element 1904 may further include instructions to specify the start time and end time for a given schedule command or value.

The exception schedule elements 1906 are transient entities denoting non-scheduled start points and end points for one or more values or commands associated with a schedule. Generally the exception schedule elements 1906 are deleted after they have expired (e.g. after the end point date or time). In some embodiments, the exception schedule elements 1906 are deleted after a given period of time has passed since the exception schedule element 1906 expires. For example, the exception schedule elements 1906 may be deleted one calendar month after the expiration time. In other examples, the exception schedule elements 1906 may be stored indefinitely. The exception schedule elements 1906 may include default entities and calendar reference entities, as well as other exception schedule entities. The default entities may be associated with default values or commands associated with the exception schedule element 1906. The default entities may include multiple pieces of information, including day/date information, a list of start time/value pairs, an associated precedence (e.g. priority of the exception relative to other exceptions for the schedule), as well as other default information. The calendar reference entities may allow a user to use a "calendar" object to set the dates for the exception schedule elements 1906. The calendar objects may define the dates that the exception is in effect. Each date, would have a list of "events" or start time/value pairs for the schedule to execute. Similarly, calendar referenced exceptions would also have precedences. In some embodiments, the calendar entities may refer to a "global calendar." The "global calendar" may relate to a series of entries in a calendar that are defined externally (e.g. by another object, potentially on a different processing engine).

The calendar entries elements 1908 allow a user to use a calendar object to set the dates for a scheduled action. For example, the use may use a calendar application to set certain dates for actions to occur (e.g. set values or commands). Finally, the default schedule command elements 1910 are commands that are generated when a scheduled action in an exception schedule or weekly schedule is no longer in effect. This could simply be a release of a scheduled command, or could be a new write to the scheduled items. In some embodiments, the default schedule command elements 1910 are predefined commands or values for use in the BMS. In other embodiments, the default schedule command elements may be set by a system administrator or a supervisory system.

The schedule element conversion logic block 1912 is configured to convert the extracted schedule elements 1902-1910 to one or more data objects 1914. In one embodiment, the schedule element conversion logic block 1912 utilizes a precedence calculation output to generate the data objects 1914 associated with an "effective schedule." The effective schedule is a series of events (e.g. a potential change in what is currently happening in the system). The schedule element conversion logic block 1912 may apply rules to set the precedences of events. For example, an event causing an effective period to become disabled may be the highest precedence event. An exception event (e.g. an exception schedule element 1906) may always have a higher precedence than a weekly schedule event. An exception event (e.g. an exception schedule element 1906) may have a defined precedence, which may be compared to a precedence of a conflicting exception event. An event can end either with the start of a different event or a passive stop event (e.g. scheduled end). When any two events have equal precedence using the above rules, the first event may be considered to have higher precedence. The above rules are for example purposes, and it is understood that additional or different rules may be used to set a precedence order of events.

The schedule element conversion logic block 1912 may then generate one or more data objects 1914. In one embodiment, the data objects 1914 are BACnet objects that can be transmitted over a BACnet network. However, the data objects 1914 may be other object types, as applicable. As described above, the data objects 1914 may include value change objects and/or command objects.

Figure 20:
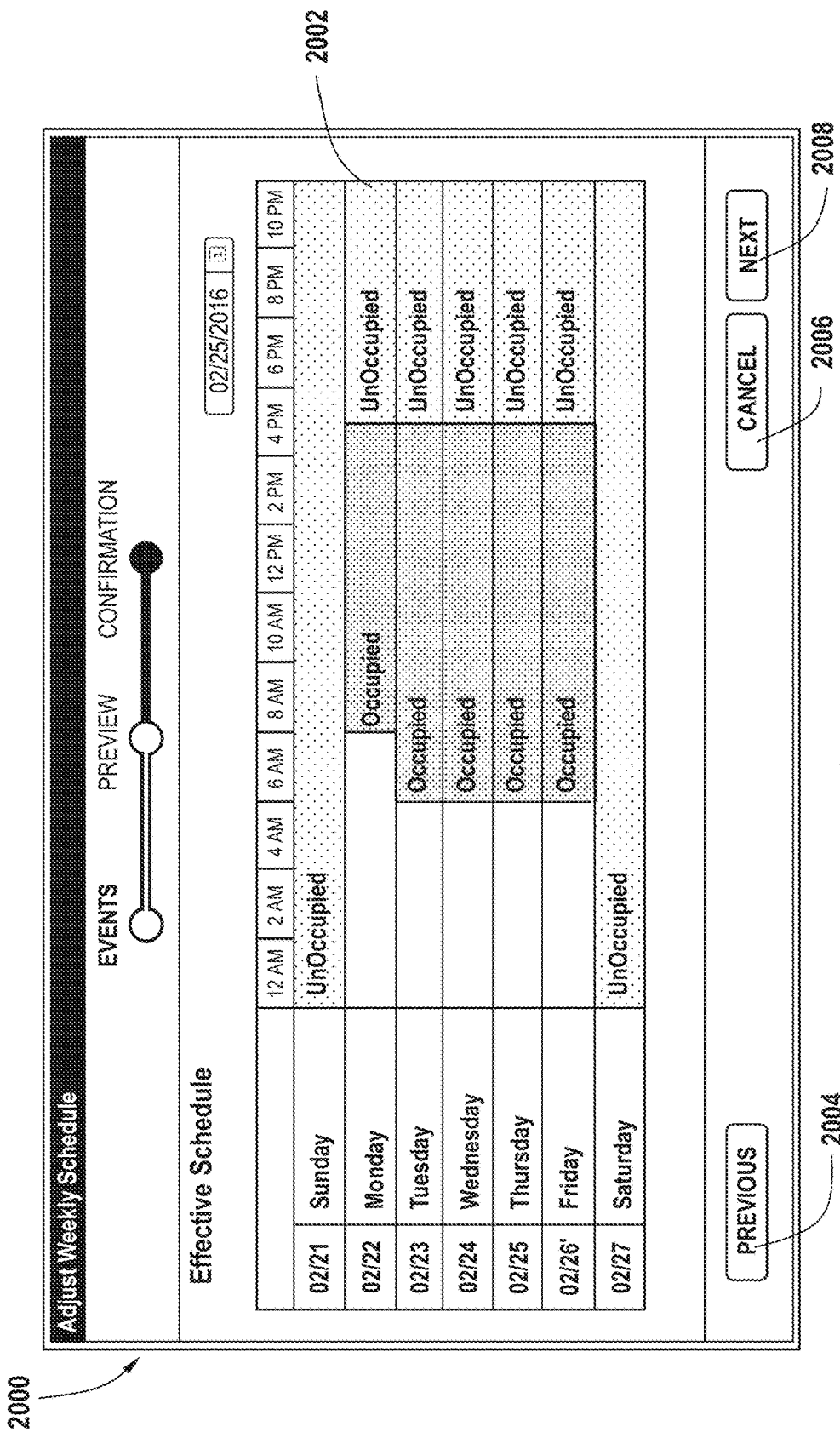
FIG. 20 is an illustration of a schedule modification preview GUI, according to some embodiments.

Returning now to FIG. 18, once the scheduling elements have been converted into individual data objects at process block 1806, the schedule may be previewed and confirmed by a user. Turning now to FIG. 20, a schedule modification preview GUI 2000, according to one embodiment. The schedule modification preview GUI 2000 may provide a user with a schedule view 2002 including the modification or addition made to a schedule using the schedule modification GUI 1700. In one embodiment, the schedule modification preview GUI 2000 is generated when a user selects the next button 1708 in the schedule modification GUI 1700. The schedule modification preview GUI 2000 includes a previous button 2004, which may allow a user to return to a schedule modification GUI 1700 to make additional modification to the schedule. Further, the schedule modification preview GUI 2000 may include a cancel button 2006 which will exit the schedule modification preview GUI 2000 without saving any changes made to the schedule, as described above. The schedule modification preview GUI 2000 may also include a save button 2008 which can be selected to save the schedule displayed in the schedule view 2002. In some embodiment, after the user selects the save button 2008, a confirmation GUI interface may be generated to verify that the user wishes to execute the schedule change. The user may then confirm the schedule.

Returning now to FIG. 18, once the user confirms the schedule, the revised schedule may be executed at process block 1810. For example, the BMS controller 500 may communicate one or more data objects (e.g. value changes or commands) to associated equipment or devices within the BMS.

Turning now to FIG. 21, a potential problems interface GUI 2100 is shown, according to one embodiment. In one embodiment, the problem detection module 518 is configured to detect potential problems within a BMS associated with the BMS controller 500. The problem detection module 518 may further be configured to provide the potential problem information to the visualization module 512, which can generate the potential problems interface GUI 2100. The potential problems interface GUI 2100 can allow a user to select a specific space, such as a facility, building, floor, room or system and immediately see any potential issues associated with the selected space. Potential problems can include alarms, operator overrides, occupant complaints ("Hot" or "Cold" calls), etc. As shown in FIG. 21, the potential problems interface GUI 2100 is viewing potential problems for a facility. A potential problem areas interface 2102 can display possible problem areas, along with information about the potential problem. Example information can include a value of the potential problem, what equipment is associated with the potential problem, and what space may be affected (e.g. floor or room). The potential problems interface GUI 2100 can further include a location navigation tree 2104. The location navigation tree 2104 may allow for a user to further find potential problems associated with progressively lower levels of the BMS.

Figure 22:
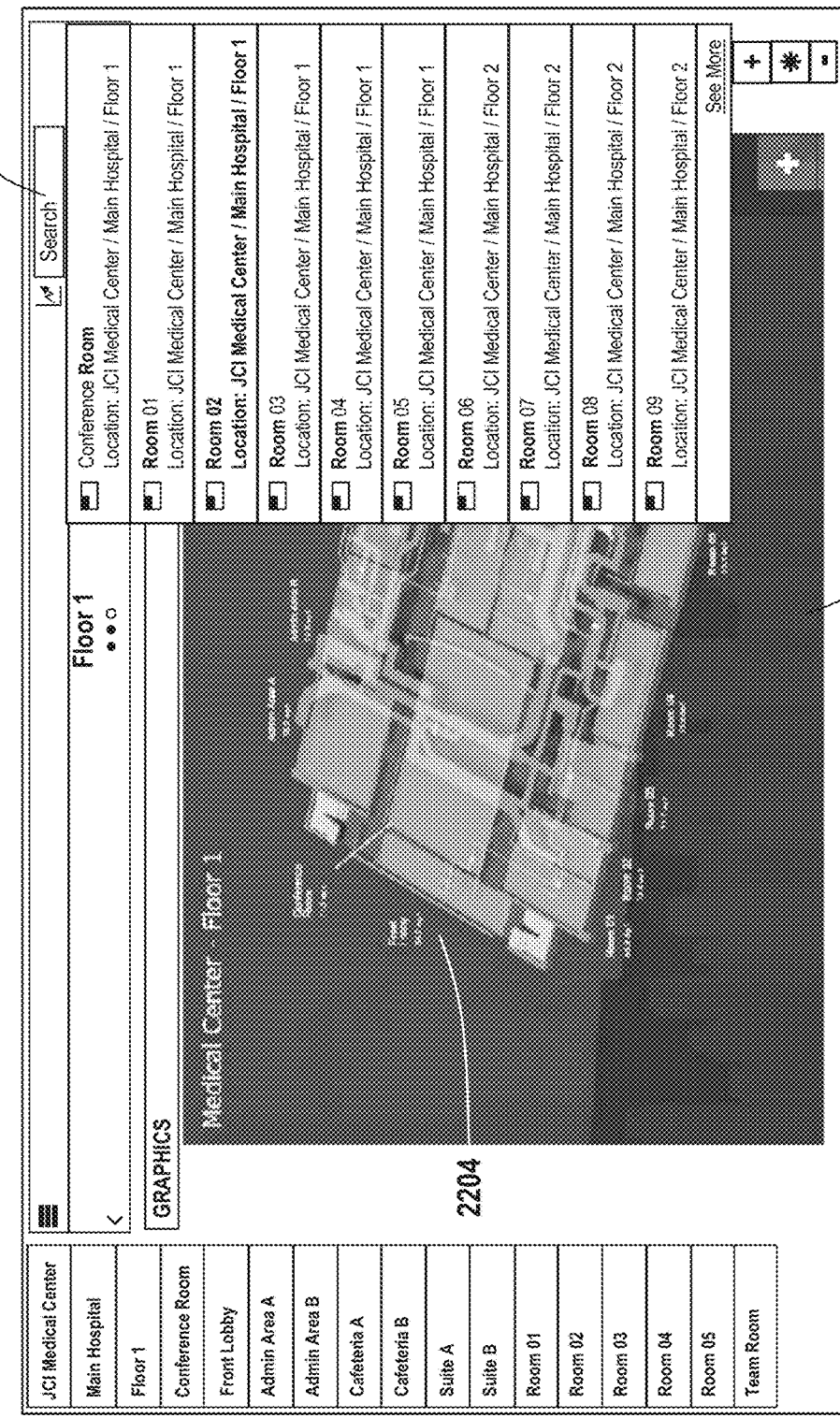
FIG. 22 is an illustration of a floor-level potential problems interface GUI, according to some embodiments.

Turning to FIG. 22, a floor-level potential problems interface GUI 2200 is shown. In one embodiment, the floor-level potential problems interface GUI 2200 includes a floor interface 2202. The floor interface 2202 may provide a user with a visual indication of potential problem area. In one embodiment, the floor interface 2202 provides a user with visual indication of potential problem areas by color coding the individual spaces on the floor. For example, front lobby space 2204 may be highlighted in red to illustrate that there is a potential problem. In some examples, a user may wish to search for a particular space within a facility, building or floor. As shown in FIG. 22, a user can search for a particular space using the search bar 2206. For example, the user, searching for room 2, may enter "room" into the search bar 2206, and then select "room 2" from the list of options provided.

Turning to FIG. 23, a floor equipment service space interface GUI 2300 is shown, according to one embodiment. In one embodiment, the equipment service space module 520 is configured to determine equipment associated with a given space within a BMS associated with the BMS controller 500. The equipment service space module 520 may further be configured to provide the equipment service space information to the visualization module 512, which can generate the floor equipment service space interface GUI 2300. In further embodiments, the equipment service space module 520 may be in communication with the association module 524. The association module 524 may provide the equipment service space module 520 with equipment associated with one or more spaces in the BMS. The floor equipment service space interface GUI 2300 includes an equipment serving space interface 2302, a potential problem areas interface 2304, an equipment summary interface 2306 and a navigation tree 2308. The equipment serving space interface 2302 may provide details regarding the each piece of equipment servicing a particular space. In FIG. 23, the space is a floor. The equipment serving space interface 2302 can include current parameters and/or a status of each piece of equipment serving the selected space. For example, equipment serving space interface 2302 shows AHU-1 as a piece of equipment serving the selected space, and displays parameters associated with the "Discharge Air Temperature," the "Discharge Air Temperature Setpoint," and the "Effective Discharge Air Setpoint." The equipment service space interface 2302 can include a filter button 2310. The filter button 2310 can be used to filter what information is shown in the equipment serving space interface 2302. For example, the filter button 2310 may allow a user to filter the equipment serving space interface 2302 to only show certain types of equipment serving the selected space, such as all air handling units. In other examples, the filter button 2310 may allow a user to filter the equipment serving space interface 2302 to only show certain data associated with each of the different pieces of equipment serving the selected space.

The potential problem areas interface 2304 of the floor equipment service space interface GUI 2300 may display all the potential problems associated with the selected space. In one embodiment, the potential problems are the same types of potential problems described in regards to FIG. 21, discussed above. The potential problem areas interface 2304 may include a problem filter input 2312. The problem filter input 2312 can allow a user to filter the potential problems listed in the potential problem areas interface 2304. Example filter parameter can include priority, type, associated equipment, space affected, parameter value, etc. The equipment summary interface 2306 may provide a brief summary of each piece of equipment serving the selected space. In one embodiment, selecting a piece of equipment listed in the equipment summary interface 2306 causes the selected piece of equipment, and its related information, to be displayed in the equipment serving space interface 2302. The equipment summary interface 2306 can further include a device type selection input 2314. The device type selection input 2314 can allow a user to filter the equipment summary interface 2306 to display only certain types of equipment. For example, a user may filter the equipment summary interface 2306 to show only heating equipment, cooling equipment, air handling equipment, lighting equipment, etc. Finally, the navigation tree 2308 may allow for a user to select other spaces associated with progressively lower levels of the BMS.

Figure 24:
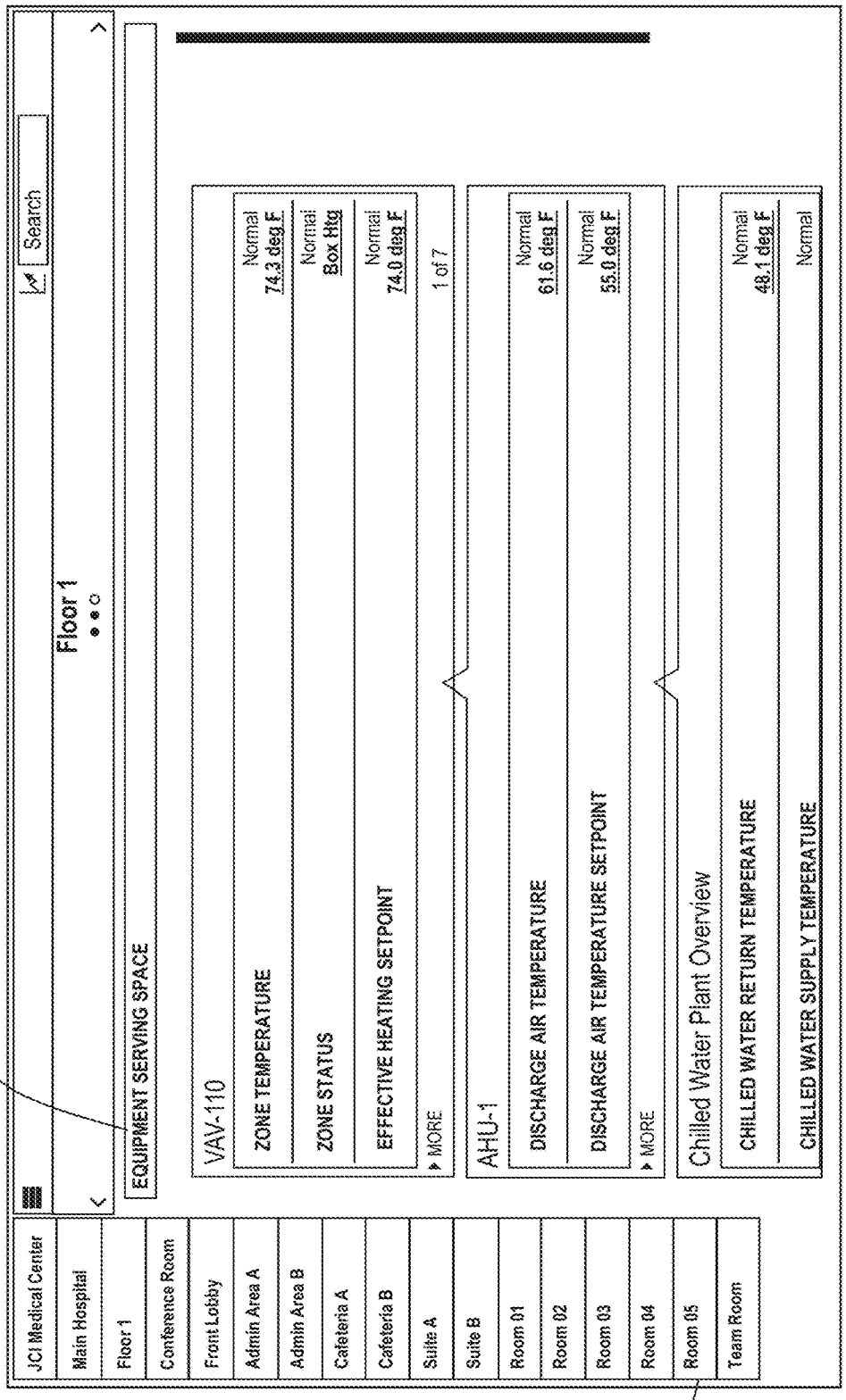
FIG. 24 is an illustration of a room equipment serving space interface, according to some embodiments.

Turning now to FIG. 24, a room equipment serving space interface GUI 2400 is shown, according to one embodiment. In one embodiment, the room is selected using a navigation tree 2402, which may be the same as navigation tree 2308, discussed in FIG. 23 above. The room equipment serving space interface GUI 2400 may include an equipment serving space interface 2404. The equipment serving space interface 2404 may display each piece of equipment serving the selected space (i.e. room 2), as shown in FIG. 24. The equipment serving space interface 2404 may further display details about each piece of equipment, similar to the equipment service space interface GUI 2300 described above.

Turning to FIG. 25, an equipment serving space summary interface GUI 2500 is shown, according to one embodiment. The equipment serving space summary interface GUI 2500 includes an equipment summary interface 2502. The equipment summary interface 2502 can provide a list of all equipment serving a selected space (e.g. building, floor, room, etc.). In one embodiment, the equipment summary interface 2502 includes a sorting bar 2504. The sorting bar 2504 can allow a user to sort the listed equipment information by a variety of categories listed in the sorting bar 2504. Example categories can include: equipment name, space/location of equipment, temperature (or other applicable parameters), equipment state, equipment set-point, minimum set-points, maximum set-points, set-point differential, location occupancy mode, etc. Other categories are additionally considered. The equipment summary interface 2502 can further include a device filter button 2506. The device filter button 2506 may allow a user to select the type of device(s) to be displayed on the equipment summary interface 2502. For example, a user may only want to see what VAVs are associated with a particular floor.

Figure 26:
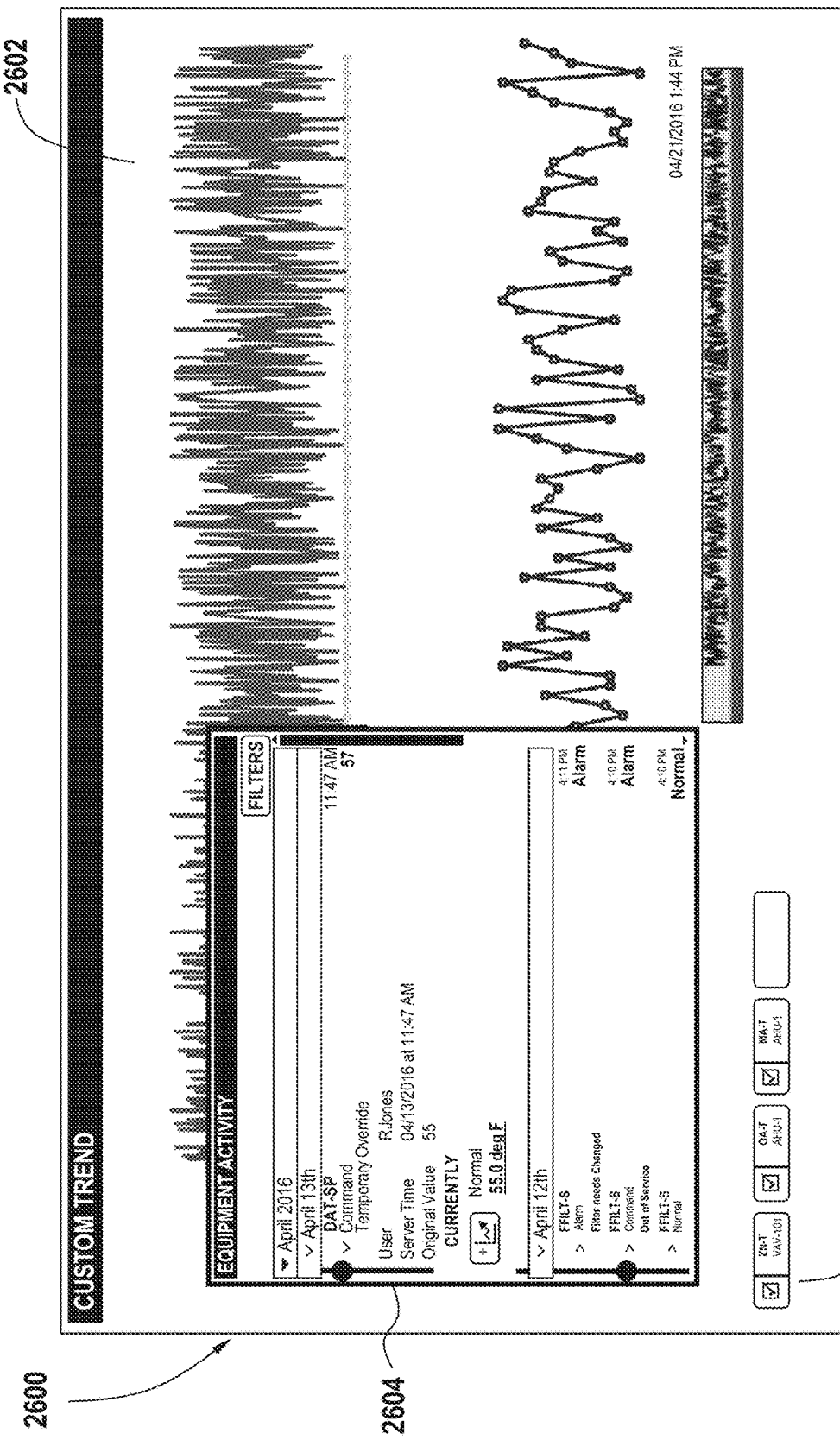
FIG. 26 is an illustration of a data trend GUI, according to some embodiments.

Turning now to FIG. 26, a data trend GUI 2600 is shown, according to one embodiment. In one embodiment, the data analytics module 522 is configured to analyze data associated with one or more pieces of equipment within a BMS associated with the BMS controller 500. The data analytics module 522 may further be configured to provide analyzed data to the visualization module 512, which can generate the data trend GUI 2600. In one example, the data analytics module 522 is configured to analyze the data from one or pieces of equipment in the BMS to generate one or more trends. In one embodiment, the data trend GUI 2600 is generated when a user selects a trend data icon, such as the trend data icon 712 discussed in FIG. 7, above. The data trend GUI 2600 can provide trend data for one or more selected systems or pieces of equipment in the BMS. The data trend GUI 2600 may include a trend data interface 2602 and an equipment activity window 2604. The trend data interface 2602 can provide graphical trend data of a particular piece of equipment or system. In one embodiment, the trend data is real-time data. The data can also be historical data, or a combination of historical data and real-time data. The trend data interface 2602 can include a data selection toolbar 2606. The data selection toolbar 2606 can allow a user to select what parameters to display on the trend data interface 2602. In one example, the trend data interface 2602 may allow a user to custom select the time scale, sampling rate, and/or other parameters of the trend data to generate a custom trend. The equipment activity window 2604 may provide a user with details related to the selected equipment or system, such as current parameters, equipment data (name, set-points, etc.), alarms associated with the equipment, equipment status, etc.

Configuration of Exemplary Embodiments

The construction and arrangement of the systems and methods as shown in the various exemplary embodiments are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.). For example, the position of elements can be reversed or otherwise varied and the nature or number of discrete elements or positions can be altered or varied. Accordingly, all such modifications are intended to be included within the scope of the present disclosure. The order or sequence of any process or method steps can be varied or re-sequenced according to alternative embodiments. Other substitutions, modifications, changes, and omissions can be made in the design, operating conditions and arrangement of the exemplary embodiments without departing from the scope of the present disclosure.

The present disclosure contemplates methods, systems and program products on any machine-readable media for accomplishing various operations. The embodiments of the present disclosure can be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

Although the figures show a specific order of method steps, the order of the steps may differ from what is depicted. Also two or more steps can be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection steps, processing steps, comparison steps and decision steps.

What is claimed is:

1. A building management system (BMS) interface system, comprising:
   a user interface;
   one or more processors; and
   one or more non-transitory computer-readable media storing instructions that, when executed by the one or more processors, cause the one or more processors to perform operations comprising:
   displaying a graphical scheduling interface on the user interface;
   receiving a scheduling input from the user interface;
   extracting one or more scheduling elements from the received scheduling input, the scheduling elements comprising an indication of a space or equipment to which the scheduling elements apply and a desired state or condition of the space or equipment;
   automatically identifying one or more points that correspond to the space or equipment indicated by the scheduling elements that are used to operate the equipment in order to achieve the desired state or condition, the one or more points identified using stored relationships between the points and the corresponding space or equipment;

automatically generating one or more BMS data objects for each of the one or more points based on the scheduling input, the BMS data objects defining, for each of the one or more points, one or more point values and a time at which the point is to be set to each of the one or more point values;

updating the graphical scheduling interface displayed on the user interface; and executing one or more scheduling instructions based on the BMS data objects, wherein the scheduling instructions are associated with operation of one or more BMS devices and cause each of the one or more points to be set to a corresponding point value at a corresponding time.

2. The system of claim 1, wherein the BMS data objects are BACnet data objects.

3. The system of claim 1, wherein the graphical scheduling interface displays one or more operations associated with the BMS devices.

4. The system of claim 1, wherein the graphical scheduling interface displays a schedule associated with one or more of a space, a date, or piece of equipment.

5. The system of claim 1, wherein the graphical scheduling interface is configured to allow a user to override a defined schedule using the user interface.

6. The system of claim 5, wherein the defined schedule may be one of overridden permanently, overridden for a predefined period of time, and overridden for a user defined period of time.

7. The system of claim 1, wherein the processor is further configured to display a breakout schedule interface on the user interface, wherein the breakout schedule interface is configured to display a selected schedule comprising a schedule for a predefined period of time, a list of exceptions, and a list of default commands for the schedule.

8. The system of claim 1, wherein the processor is further configured to display an equipment summary interface, wherein the equipment summary interface displays a list of equipment, and parameters associated with the equipment, for a given space.

9. The system of claim 8, wherein the processor is further configured to automatically determine which equipment is associated with the given space based on one or more predetermined relationship parameters associated with the equipment and the space.

10. The system of claim 8, wherein the processor is further configured to generate trend data for a selected piece of equipment displayed in the equipment summary interface, wherein the equipment is selected by a user using the user interface.

11. A method for scheduling one or more building management system (BMS) operations for a space, the method comprising:

receiving a scheduling input from a user at a processor;

extracting one or more scheduling elements from the scheduling input, the scheduling elements comprising an indication of a space or equipment to which the scheduling elements apply and a desired state or condition of the space or equipment;

automatically identifying one or more points that correspond to the space or equipment indicated by the scheduling elements and that are used to operate the equipment in order to achieve the desired state or condition, the one or more points identified using stored relationships between the points and the corresponding space or equipment;

automatically generating one or more BMS data objects for each of the one or more points based on the scheduling input, the BMS data objects defining, for each of the one or more points, one or more point values and a time at which the point is to be set to each of the one or more point values;

transmitting a schedule confirmation request to the user;

receiving a schedule confirmation from the user at the processor; and executing a confirmed schedule, wherein executing the confirmed schedule comprises operating one or more BMS devices based on the BMS data objects and causing each of the one or more points to be set to a corresponding point value at a corresponding time.

12. The method of claim 11, wherein the scheduling input is one or more of an input to generate a new schedule and an input to modify an existing schedule.

13. The method of claim 11, wherein the BMS data objects are BACnet data objects.

14. The method of claim 11, wherein the processor is configured to automatically associate one or more BMS devices with the space based on one or more pre-defined parameters of the one or more BMS devices.

15. The method of claim 11, further comprising generating a preview of the schedule prior to receiving the schedule confirmation.

16. A building management system (BMS) graphical user interface system, comprising:

a user interface device;

one or more processors; and one or more non-transitory computer-readable media storing instructions that, when executed by the one or more processors, cause the one or more processors to perform operations comprising:

automatically associating one or more BMS devices with a space;

displaying a graphical scheduling interface for the space on the user interface device, wherein the graphical scheduling interface is configured to display an operational schedule for the one or more BMS devices associated with the space;

receiving a scheduling input from the user interface device, wherein the scheduling input is one of a new schedule request and a schedule modification request;

extracting one or more scheduling elements from the received scheduling input, the scheduling elements comprising an indication of a space or equipment to which the scheduling elements apply and a desired state or condition of the space or equipment;

automatically identifying one or more points that correspond to the space or equipment indicated by the scheduling elements and that are used by the processors to operate the equipment in order to achieve the desired state or condition, the one or more points identified using stored relationships between the points and the corresponding space or equipment;

automatically generating one or more BMS data objects for each of the one or more points based on the scheduling input, the BMS data objects defining, for each of the one or more points, one or more point values and a time at which the point is to be set to each of the one or more point values, wherein the BMS data objects are data objects capable of being executed by the processors; and executing one or more scheduling instructions based on the BMS data objects, wherein the scheduling instructions are associated with operation of one or more BMS devices and cause each of the one or more points to be set to a corresponding point value at a corresponding time.

17. The system of claim 16, wherein the space is one or more of a campus, a building, a portion of a building, or a room within a building.

18. The system of claim 16, wherein the BMS data objects are BACnet data objects.

19. The system of claim 16, wherein the processor is further configured to display an equipment summary interface, wherein the equipment summary interface displays a list of equipment and parameters associated with the equipment for a given space.

20. The system of claim 19, wherein the processor is further configured to generate and display trend data for a selected piece of equipment displayed in the equipment summary interface, wherein the equipment is selected by a user using the user interface device.

* * * * *